United States Patent
Bae et al.

(10) Patent No.: US 9,838,640 B2
(45) Date of Patent: **\*Dec. 5, 2017**

(54) APPARATUS AND METHOD FOR DISPLAYING A TELEVISION VIDEO SIGNAL AND DATA IN A MOBILE TERMINAL ACCORDING TO A MODE THEREOF

(75) Inventors: Seung-Gyun Bae, Kumi-shi (KR); Yong-Min Kim, Kumi-shi (KR); Hwan-Gee Jang, Seoul (KR)

(73) Assignee: Samsung Electronics Co., Ltd (KR)

( * ) Notice: Subject to any disclaimer, the term of this patent is extended or adjusted under 35 U.S.C. 154(b) by 2181 days.

This patent is subject to a terminal disclaimer.

(21) Appl. No.: 10/658,545

(22) Filed: Sep. 10, 2003

(65) Prior Publication Data

US 2004/0055011 A1   Mar. 18, 2004

(30) Foreign Application Priority Data

Sep. 17, 2002   (KR) .................................. 2002-56639

(51) Int. Cl.
*H04N 7/16* (2011.01)
*H04N 5/44* (2011.01)
(Continued)

(52) U.S. Cl.
CPC ........... *H04N 5/4448* (2013.01); *H04B 1/406* (2013.01); *H04M 1/72522* (2013.01);
(Continued)

(58) Field of Classification Search
USPC ................. 725/62, 73, 75, 72; 348/838, 564
See application file for complete search history.

(56) References Cited

U.S. PATENT DOCUMENTS 5,418,576 A * 5/1995 Ross .............................. 348/686
5,640,502 A   6/1997 Knox et al.
(Continued)

FOREIGN PATENT DOCUMENTS

DE   198 15 553   10/1999
DE   199 61 067   6/2000
(Continued)

*Primary Examiner* — Junior Mendoza
(74) *Attorney, Agent, or Firm* — The Farrell Law Firm, P.C.

(57) ABSTRACT

An apparatus and method for receiving and displaying a television signal and a data signal in a mobile terminal. The mobile terminal includes a display unit with a video data display area and a user data display area. The mobile terminal determines in a standby mode whether it is set to a television mode or communication mode. If the mobile terminal is set to the television mode, it controls a tuner to select a desired television channel. The mobile terminal stores video data of a current frame received over the selected channel and user data corresponding to the selected channel in a memory unit, outputs video data of a previous frame stored in the memory unit to the video data display area of the display unit in a frame period and then outputs the user data stored in the memory unit to the user data display area of the display unit upon completing the output of the video data of the previous frame. In the communication mode, the mobile terminal stops the operation of the tuner and displays user data generated in the communication mode in the video data display area and user data display area.

10 Claims, 15 Drawing Sheets

(51) Int. Cl.
*H04B 1/403* (2015.01)
*H04M 1/725* (2006.01)
*H04N 7/14* (2006.01)
*H04N 21/414* (2011.01)
*H04N 21/431* (2011.01)
*H04N 21/433* (2011.01)
*H04N 21/439* (2011.01)
*H04N 21/4402* (2011.01)
*H04N 21/47* (2011.01)
*H04N 21/478* (2011.01)
*H04N 21/485* (2011.01)
*H04N 21/488* (2011.01)
*H04N 5/38* (2006.01)
*H04N 5/445* (2011.01)

(52) U.S. Cl.
CPC .......... *H04M 1/72544* (2013.01); *H04N 5/44* (2013.01); *H04N 5/44513* (2013.01); *H04N 5/44543* (2013.01); *H04N 7/147* (2013.01); *H04N 21/41407* (2013.01); *H04N 21/4312* (2013.01); *H04N 21/4314* (2013.01); *H04N 21/4331* (2013.01); *H04N 21/4396* (2013.01); *H04N 21/4402* (2013.01); *H04N 21/440263* (2013.01); *H04N 21/47* (2013.01); *H04N 21/478* (2013.01); *H04N 21/485* (2013.01); *H04N 21/4884* (2013.01); *H04N 5/38* (2013.01); *H04N 5/44504* (2013.01); *H04N 21/4316* (2013.01); *H04N 2005/4421* (2013.01); *H04N 2005/4425* (2013.01); *H04N 2007/145* (2013.01)

(56) References Cited

U.S. PATENT DOCUMENTS

| | | | | |
|---|---|---|---|---|
| 5,917,552 | A * | 6/1999 | Van Court | 348/558 |
| 6,188,800 | B1 * | 2/2001 | Okitsu | 382/276 |
| 6,204,842 | B1 | 3/2001 | Fujii | |
| 6,335,728 | B1 * | 1/2002 | Kida et al. | 345/204 |
| 6,369,858 | B1 | 4/2002 | Lee | |
| 6,396,542 | B1 * | 5/2002 | Patel | 348/445 |
| 6,681,285 | B1 * | 1/2004 | Ng | 710/309 |
| 6,885,406 | B2 * | 4/2005 | Yui et al. | 348/564 |
| 2001/0039663 | A1 | 11/2001 | Sibley | |
| 2002/0036642 | A1 * | 3/2002 | Kwon et al. | 345/531 |
| 2002/0075256 | A1 | 6/2002 | Hiltunen et al. | |
| 2002/0093531 | A1 * | 7/2002 | Barile | 345/753 |
| 2003/0169369 | A1 * | 9/2003 | Kahn | 348/468 |
| 2004/0041850 | A1 * | 3/2004 | Park et al. | 345/904 |
| 2004/0100578 | A1 * | 5/2004 | Park | 348/432.1 |
| 2004/0107439 | A1 * | 6/2004 | Hassell et al. | 725/44 |
| 2004/0204020 | A1 * | 10/2004 | Kuramitsu | 455/550.1 |
| 2005/0262542 | A1 * | 11/2005 | DeWeese et al. | 725/106 |
| 2007/0206518 | A1 * | 9/2007 | Yamaguchi | 370/310 |
| 2010/0175084 | A1 * | 7/2010 | Ellis et al. | 725/32 |

FOREIGN PATENT DOCUMENTS

| | | | |
|---|---|---|---|
| DE | 101 47 665 | 10/2002 | |
| EP | 0 804 040 A2 | 10/1997 | |
| EP | 0 862 327 | 9/1998 | |
| GB | 2347588 * | 6/2000 | 725/62 |
| GB | 2347589 * | 6/2000 | 725/62 |
| GB | 2347051 A * | 8/2000 | H04M 11/08 |
| GB | 2 347 588 | 9/2000 | |
| GB | 2 347 589 | 9/2000 | |
| GB | 2347588 | 9/2000 | H04Q 7/22 |
| GB | 2347588 A * | 9/2000 | 725/61 |
| GB | 2347589 | 9/2000 | |
| JP | 10-98706 | 4/1998 | |
| JP | 10-1261710 | 5/1998 | |
| JP | 11-196397 | 7/1999 | |
| JP | 033799 | 1/2000 | H04M 1/00 |
| JP | 2002-27145 | 6/2002 | |
| JP | 2002-164992 | 6/2002 | |
| JP | 2003-111054 | 4/2004 | |
| KR | 2001-059645 * | 7/2001 | 725/62 |
| WO | WO 01-17255 | 3/2001 | |
| WO | WO 02/01879 A2 | 1/2002 | |

* cited by examiner

* SUB-MENU DISPLAY AREA COORDINATES ON LCD
FONT SIZE (18*19)*3ROW = 57PIXEL + MARGIN 3PIXEL = 60PIXEL
* TV PICTURE DISPLAY AREA (IF FULL) → 176X220 ALL USED

APPARATUS AND METHOD FOR DISPLAYING A TELEVISION VIDEO SIGNAL AND DATA IN A MOBILE TERMINAL ACCORDING TO A MODE THEREOF

PRIORITY

This application claims priority to an application entitled "APPARATUS AND METHOD FOR DISPLAYING TELEVISION VIDEO SIGNAL AND DATA IN MOBILE TERMINAL ACCORDING TO MODE THEREOF", filed in the Korean Intellectual Property Office on Sep. 17, 2002 and assigned Serial No. 2002-56639, the contents of which are hereby incorporated by reference.

BACKGROUND OF THE INVENTION

1. Field of the Invention

The present invention relates to a display apparatus and method for a mobile terminal, and more particularly to a display apparatus and method for receiving and displaying a television video signal and data in a mobile terminal which provides a television mode and a communication mode of operation.

2. Description of the Related Art

The present trend in mobile terminals is to provide a high-speed data transfer function as well as a voice communication function. That is, mobile terminals can conduct high-speed data communication over an International Mobile Telecommunications 2000 (IMT 2000) mobile communication network, in addition to voice communication. The data may be, for example, packet data and image data.

Such a mobile terminal has a display unit, the size of which has been increasing. The mobile terminal may display picture data or pixel data received from a base station, or process image data captured by a camera. The mobile terminal may also receive and display a television video signal. In this case, the mobile terminal must additionally have a television receiving function and be able to perform a communication function simultaneously with or independently of the processing of a television signal.

SUMMARY OF THE INVENTION

Therefore, it is an object of the present invention to provide a display apparatus and method for a mobile terminal with a wireless communication function which can perform a television video signal display mode and a communication mode.

It is another object of the present invention to provide a display apparatus and method for a mobile terminal which can simultaneously display a television video signal and a communication mode associated message in a communication mode.

It is a further object of the present invention to provide a display apparatus and method for a mobile terminal which can display a communication mode associated message in a television video signal display area in on-screen display (OSD) text form.

It is another object of the present invention to provide a display apparatus and method for a mobile terminal which can display a received communication message in a television video signal display state according to a user's selection.

It is yet another object of the present invention to provide a display apparatus and method for a mobile terminal which can display a transmitting message in a television video signal display state according to a user's selection.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
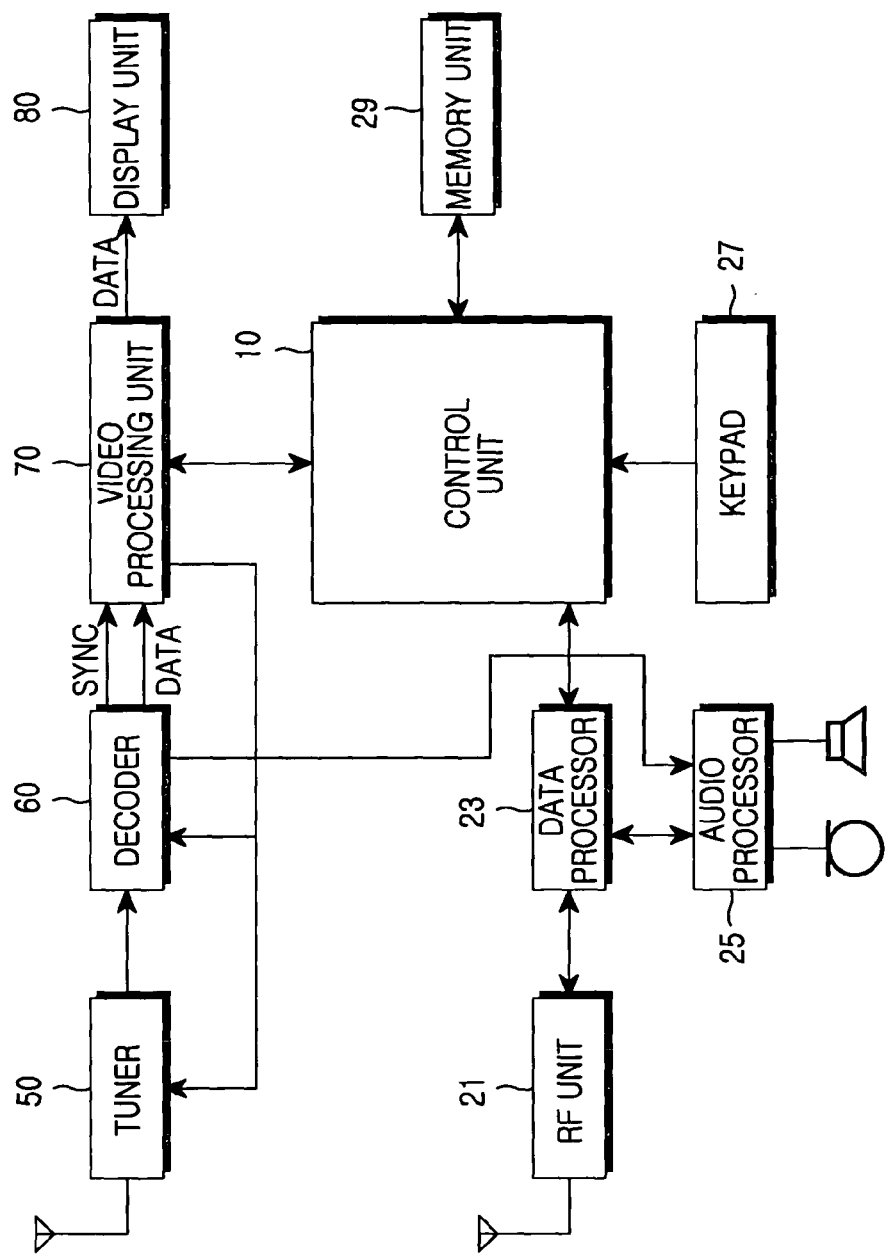
FIG. 1 is a block diagram illustrating an example of a mobile terminal for displaying a television video signal according to an embodiment of the present invention.

FIG. 1 is a block diagram illustrating an example of a mobile terminal according to an embodiment of the present invention, which is preferably a mobile telephone.

With reference to FIG. 1, the mobile telephone comprises a radio frequency (RF) unit 21 for performing wireless communication for the mobile telephone. The RF unit 21 includes an RF transmitter (not shown) for up-converting the frequency of a signal to be transmitted and amplifying the resulting signal, and an RF receiver (not shown) for low-noise amplifying a received signal and down-converting the frequency of the resulting signal. A data processor 23 includes a transmitter (not shown) for encoding and modulating the signal to be transmitted, and a receiver (not shown) for demodulating and decoding the received signal. That is, the data processor 23 is implemented with a modulator/demodulator (modem) and a coder/decoder (codec). An audio processor 25 functions to reproduce a receive audio signal from the data processor 23, or transfer a transmit audio signal from a microphone to the data processor 23. The audio processor 25 further functions to reproduce an audio signal of a television signal output from a decoder 60, which will be described later in detail, in a television mode.

A keypad 27 includes keys for inputting numeric and character information, and function keys for setting various functions. The keypad 27 further includes keys for setting various modes for the processing of a television video signal according to the embodiment of the present invention. A memory unit 29 includes a program memory (not shown) and a data memory (not shown). The program memory stores programs for control of a general operation of the mobile telephone and programs for the processing of a television video signal according to the embodiment of the present invention. The data memory functions to temporarily store data generated during execution of the programs stored in the program memory.

A control unit 10 functions to control the entire operation of the mobile telephone. The control unit 10 may include the data processor 23. In the embodiment of the present invention, the control unit 10 controls a video processing unit 70 in response to a mode setting signal from the keypad 27 such that it is operated in the television mode or a communication mode. In the television mode, the control unit 10 controls the video processing unit 70 to display a received television video signal, and outputs user data associated with the television mode to the video processing unit 70. In the communication mode, the control unit 10 controls the video processing unit 70 such that it is operated in the television mode or an OSD mode, and outputs user data generated in the communication mode to the video processing unit 70.

If the communication mode occurs when the television mode is performed (for example, when an incoming call or outgoing call occurs in the television mode), the control unit 10 can stop the television mode and then perform the communication mode. Alternatively, when the communication mode occurs during the television mode, the control unit 10 may perform the communication mode while performing the television mode. When the communication mode is performed during the television mode, it can be a voice communication mode or data communication mode. When performing the voice communication mode during the television mode, the control unit 10 blocks a television audio signal from the decoder 60 and performs a control operation to perform voice communication. At this time, a television video signal and/or an OSD signal can be displayed on a display unit 80, which will be described later in detail. When performing the data communication mode in the television mode, the control unit 10 can display text data on a television picture if it is a text communication mode.

A tuner 50 functions to receive a television signal of a channel selected under the control of the control unit 10 and perform a frequency conversion operation with respect to the received television signal. The decoder 60 functions to demodulate and decode an output television signal from the tuner 50. That is, the decoder 60 separates the television signal from the tuner 50 into a television audio signal and a television video signal, decodes the separated audio signal and video signal and transfers the decoded audio signal to the audio processor 25 and the decoded video signal to the video processing unit 70, respectively. The decoder 60 also decodes the television video signal to output red (R), green (G) and blue (B) color signals and synchronous signals (a horizontal synchronous signal and a vertical synchronous signal).

The video processing unit 70 is in data communication with the control unit 10 and performs a signal processing function of displaying user data from the control unit 10 and an output television video signal received from the decoder 60 under the television mode and communication mode control of the control unit 10. The video processing unit 70 also functions to, in the television mode, process a television video signal from the decoder 60 and user data from the control unit 10 and output the processed results respectively to corresponding areas of the display unit 80. The user data preferably includes a current time, a battery level indicator, a reception sensitivity, etc. The user data also includes data regarding a changed state of the television mode. The video processing unit 70 processes and outputs the television video signal from the decoder 60 on a frame basis, separately from the user data. The video processing unit 70 also functions to provide a communication service associated with the communication mode in the television mode or OSD mode. That is, when the communication mode is performed in the television mode, the video processing unit 70 outputs television video data, and user data associated with the communication mode from the control unit 10. When the communication mode is performed in the OSD mode, the video processing unit 70 blocks television video data and displays data associated with the communication mode from the control unit 10. The communication mode associated data may be, for example, a text message or subscriber information.

The display unit 80 displays output data from the control unit 10 in the communication mode and displays output television video data and user data from the video processing unit 70 respectively to the corresponding areas in the television mode. In the television mode, the display unit 80 displays the television video data from the video processing unit 70 in its first display area and the user data therefrom in its second display area, respectively. The display unit 80 further has a third display area for displaying a soft key such as a menu key. When the television mode is performed in the communication mode, the display unit 80 displays a television video signal in the first display area and user data associated with the communication mode in the second display area, respectively. When the OSD mode is performed in the communication mode, the display unit 80 displays data associated with the communication mode in the first and second display areas. The display unit 80 may preferably employ a liquid crystal display (LCD). In this case, the display unit 80 includes the following which are not shown, a LCD controller, a memory for storing image data, and an LCD. When the LCD is implemented as a touch screen, the display unit 80 may comprise an input unit together with the keypad 27.

The operation of the mobile telephone with the television picture display function will hereinafter be described with reference to FIG. 1. Firstly, in the communication mode, if a user pushes a send key after dialing a telephone number via the keypad 27, the control unit 10 detects the key input, processes received dialed information through the data processor 23 and then converts/outputs the processed result into an RF signal through the RF unit 21. Thereafter, if a called party generates a response signal, the control unit 10 receives the generated response signal through the RF unit 21 and data processor 23 and then establishes a voice call path through the audio processor 25, thereby allowing the user to communicate with the called party. In an incoming call mode, the control unit 10 detects the incoming call mode through the data processor 23 and generates a ringing signal through the audio processor 25. If the user responds to an incoming call, then the control unit 10 detects the call response and establishes a voice call path through the audio processor 25 to perform the communication function of connecting the parties. Although the voice communication function has been disclosed as an example to be performed in the outgoing and incoming call modes, a data communication function may also be performed in the same modes to transmit and receive packet data and image data. In a standby mode or text communication mode, the control unit 10 controls the video processing unit 70 such that it is operated in the OSD mode. In the OSD mode, the control unit 10 transfers user data generated in the communication mode to the video processing unit 70, which then outputs the user data from the control unit 10 to display it in the first and second display areas of the display unit 80.

Secondly, a description will be given of the operation of the mobile telephone in the television mode with reference to FIG. 2, which shows a television receiver configuration according to an embodiment of the present invention, in the construction of FIG. 1.

Figure 2:
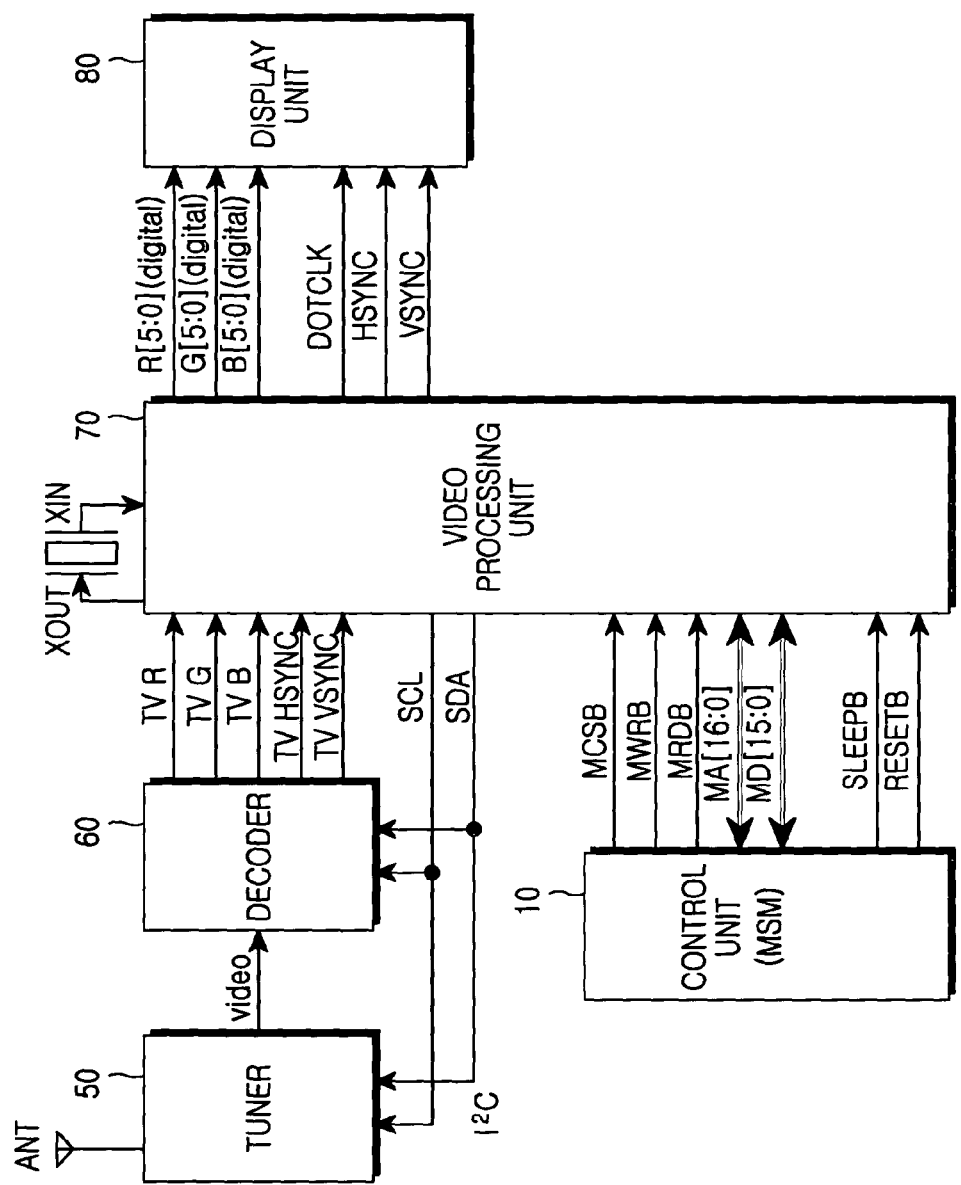
FIG. 2 is a block diagram illustrating an example of connections between a control unit and a television receiver configuration in FIG. 1 according to an embodiment of the present invention.

With reference to FIG. 2, if the user selects the television mode, the control unit 10 notifies the video processing unit 70 of the television mode selection. Then, the video processing unit 70 outputs control data for channel selection to the tuner 50 and drives the decoder 60. The tuner 50 tunes to a channel corresponding to the channel selection control data from the video processing unit 70, receives a television video signal over the tuned channel, performs a frequency conversion operation with respect to the received television video signal and outputs the resulting television video signal to the decoder 60. The decoder 60 decodes the television video signal from the tuner 50 to output an analog RGB video signal and synchronous signals (horizontal and vertical synchronous signals). That is, the decoder 60 functions to separate and output color signals from a received composite video signal. The decoder 60 is preferably of an National Television System Committee (NTSC) type, Phase Alternation Line (PAL) type or Sequential Coleur Avec Memoire (SECAM) type.

The video processing unit 70 receives the television video signal containing the RGB video signal and synchronous signals from the decoder 60, appends user data to the received television video signal and displays it on the display unit 80 along with the television video signal. At this time, the user data can be generated directly from the control unit 10. In an embodiment of the present invention, the user data may be generated from the video processing unit 70 under the control of the control unit 10. The user data is preferably displayed on the television video signal in an on-screen display (OSD) manner. The video processing unit 70 receives the analog RGB television video signal, converts it into digital data through an analog to digital (A/D) converter (ADC) therein and outputs the converted digital data to the display unit 80. The video processing unit 70 displays the user data generated from the control unit 10 or internally generated under the control of the control unit 10 in the OSD manner. The video processing unit 70 also functions to capture a displayed television picture and perform a block copy operation with respect to the OSD data.

If the communication mode occurs, the control unit 10 notifies the video processing unit 70 of the occurrence of the communication mode and the selection of the television mode or OSD mode by the user. If the communication mode occurs when the television mode is selected, the control unit 10 transfers data generated in the communication mode to the video processing unit 70. Then, the video processing unit 70 displays the communication mode associated data in the second display area of the display unit 80 at the same time as a received television video signal in the first display area of the display unit 80. When a television video signal is scaled up and displayed in the first and second display areas of the display unit 80, the video processing unit 70 block-copies the communication mode associated data from the control unit 10 and displays it on the displayed television video signal. If the communication mode occurs when the OSD mode is selected, the video processing unit 70 displays received communication mode associated data in the first and second display areas.

In this embodiment, the user data is assumed to be generated from the control unit 10. The user data is also assumed to include all other data aside from video data which is displayed on the display unit. In the following description, the user data is referred to as OSD data. Also, the OSD data has a smaller number of colors than those of the television video signal. In addition, in this embodiment, the television video data is assumed to have 65536 colors and the OSD data is assumed to have 4096 colors.

Table 1A through 1E show a register map according to an embodiment of the present invention, wherein registers are accessed by the control unit 10. In table 1, W represents a write only register command from the control unit 10 to the video processing unit 70. It is insignificant for the control unit 10 to read a register associated with the write only register command. R represents a read only register command from the control unit 10 to the video processing unit 70. The control unit 10 cannot change the contents of a register associated with the read only register command, which is a protected register. R/W represents a readable/writable register command from the control unit 10 to the video processing unit 70. In order to access a specific one of the register commands as in table 1, the control unit 10 sets a most significant bit MA16 of the corresponding address to 0 and lower-order bits MA[15:0] of that address to address bit values corresponding to the specific register command, respectively. On the other hand, in order to access user data in the video processing unit 70, the control unit 10 addresses by setting a most significant bit MA16 of the corresponding address to 1.

TABLE 1A

| Attrib | Name | Name | Function |
|---|---|---|---|
| R/W | TV MODE | TV/OSD mode select | 1: TV/OSD mode, 0: OSD only mode |
| R/W | VIDEOON | video display on/off | video display O: off, 1: on |
| R/W | OSDON | OSD display on/off | OSD display 0: off, 1: on |
| R/W | TVON | TV display on/off | TV display 0: off, 1: on |
| R/W | RAM0PON | RAM0 power on/off | RAM0 power 0: off, 1: on |

TABLE 1A-continued

| Attrib | Name | Name | Function |
|---|---|---|---|
| R/W | RAM1PON | RAM1 power on/off | RAM1 power 0: off, 1: on |
| R/W | DISP SEL | OSD display RAM sel | OSD display RAM (0 or 1) select |
| R/W | WP DISP | Wall paper (RAM2) | Wall paper (RAM2 in OSD mode) 0: off, 1: on |
| R/W | THRUEN | RGB mask color control | transparent color is 1: invalid, 0: valid |
| R/W | RW_SEL | OSD RAM access sel | TV/OSD mode 00: RAM0 (OSD) access 01–11: TV data read OSD only mode 00: RAM0 (OSD0), 01: RAM1 (OSD2) 10: RAM2 (wall paper) |

TABLE 1B

| Attrib | Name | Name | Function |
|---|---|---|---|
| R/W | RGBINV | RGB polarity | 1: OSD color invert |
| R/W | BC SEL0 | block copy RAM select0 | block copy: source RAM select |
| R/W | BC SEL1 | block copy RAM select1 | block copy: destination RAM select |
| W | BC START | block copy start | block copy start command |
| R | BC BUSY | block copy busy | 1: block copy busy: MSM can't access RAM |
| R/W | TPNOUPD | TP no update | 1: transparent color no update |
| R/W | RAM2PON | RAM2 power on/off | RAM2 power 0: off, 1: on |
| W | TV STOP | TV stop | TV display stop command |
| W | TV START | TV start | TV display start command |
| R/W | THRUPTN | RGB mask color | transparent color (12 bits) |

TABLE 1C

| Attrib | Name | Name | Function |
|---|---|---|---|
| R/W | YADJ | display shift U, D | vertical display position adjustment 2's complement (−: up, +: down) value degree: +7~−2 |
| R/W | XADJ | display shift L, R | horizontal display position adjustment 2's complement (−: left, +: right) value degree: +1~−8 |
| W | LCD SETUP | LCD setup command | 1: LCD driver setup start |
| W | LCD SLEEP | LCD sleep command | 1: LCD driver sleep mode |
| R/W | TV_ROT | TV rotation degree | 0: 0°, 1: 90°, 2: 180°, 3: 270° |
| R/W | BCX1 | source rectangle X1 | start X position of source rectangle for block copy value: 0~175, BCX1 < BCX2 |
| R/W | BCY1 | source rectangle Y1 | start Y position of source rectangle for block copy value: 0~219, BCY1 < BCY2 |
| R/W | BCX2 | source rectangle X2 | end X position of source rectangle for block copy value: 0~175, BCX1 < BCX2 |
| R/W | BCY2 | source rectangle Y2 | end Y position of source rectangle for block copy value: 0~219, BCY1 < BCY2 |
| R/W | BCDX | block copy vector X | X absolute value of block copy vector value: 0~175 |

TABLE 1D

| Attrib | Name | Name | Function |
|---|---|---|---|
| R/W | BCDY | block copy vector Y | Y absolute value of block copy vector value: 0~219 |
| R/W | BCDXSIG | sign of BC vector X | sign of BC vector X (0: right, 1: left) |
| R/W | BCDYSID | sign of BC vector Y | sign of BC vector Y (0: down, 1: up) |
| R/W | PO | output port | GPIO port 8 bits |
| R/W | BRIGHT | brightness | TV brightness. 2's compliment value |
| R/W | CONTRAST | contrast | TV contrast. 128 is normal |
| R/W | COLORMON | color monitor | TV color monitor at the middle of horizontal display line R:G:B = 5:6:5 bits |
| R/W | TVHPOS | TV H capture pos. | TV horizontal capture start position |
| R/W | TVVPOS | TV V capture pos. | TV vertical capture start position |
| R/W | HLSR | H scaling ratio | horizontal scaling ratio HLSR = 720 * 4096/VXSIZE ex) QCIF (176 * 144): HLSR = 0xaddr1 4147 FULL (220 * 176): HLSR = 0xaddr2 375d Minimum (100 * 75): HLSR = 0xaddr 37333 |

TABLE 1E

| Attrib | Name | Name | Function |
|---|---|---|---|
| R/W | VLSR | V scaling ratio | vertical scaling ratio VLSR = 240 * 2048/VYSIZE ex) QCIF (176 * 144): HLSR = 0xaddress1 0d55 FULL (220 * 176): HLSR = 0xaddress2 0ae8 minimum (100 * 75): HLSR = 0xaddress3 1999 |
| R/W | TV_XPOS | X display start pos | horizontal display start position |
| R/W | TV_YPOS | Y display start pos | vertical display start position |
| R/W | VXSIZE | display X size | display X size |
| R/W | VYSIZE | display Y size | display Y size |

Figure 3:
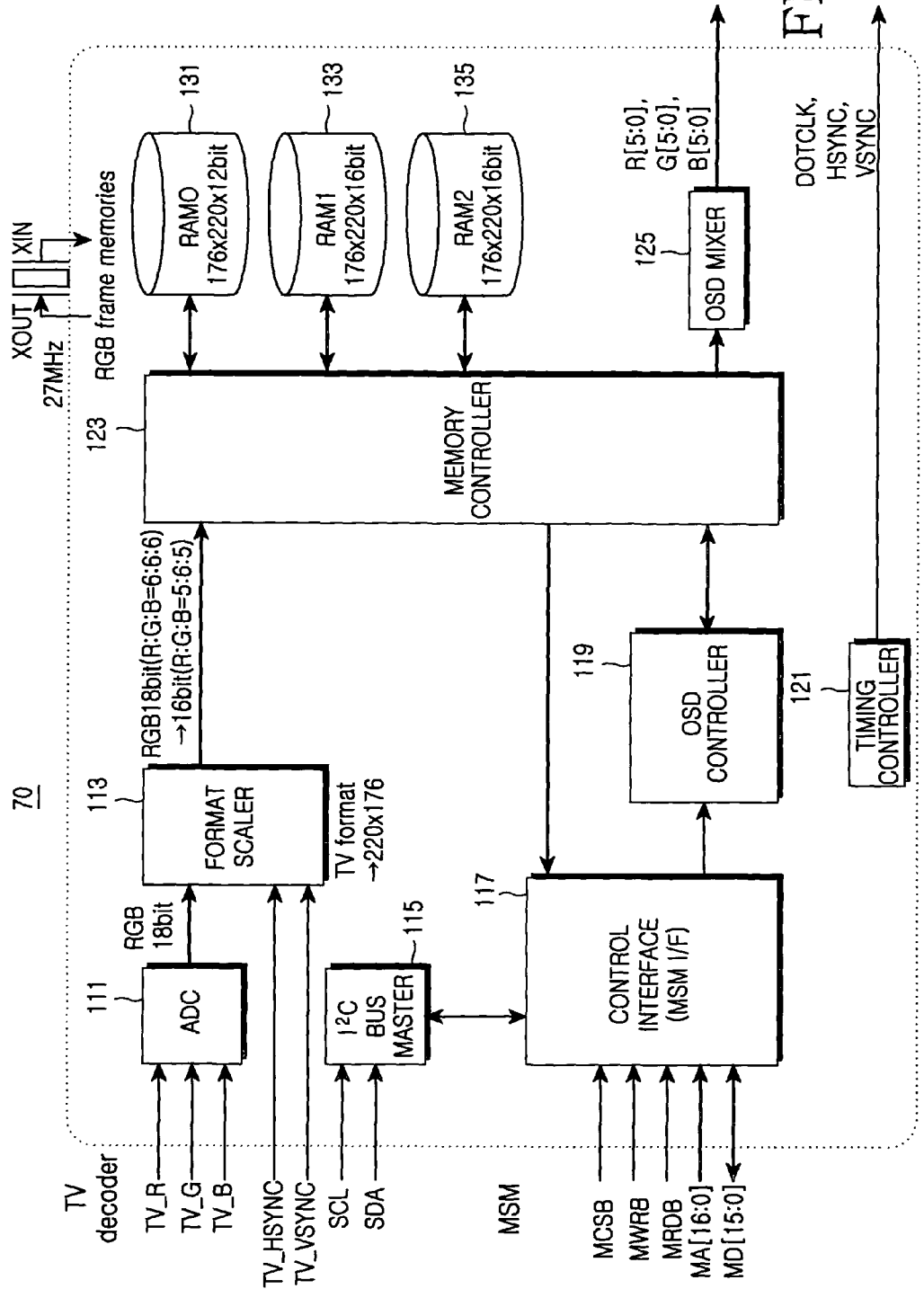
FIG. 3 is a detailed block diagram illustrating an example of a video processing unit in FIGS. 1 and 2 according to an embodiment of the present invention.
Figure 4:
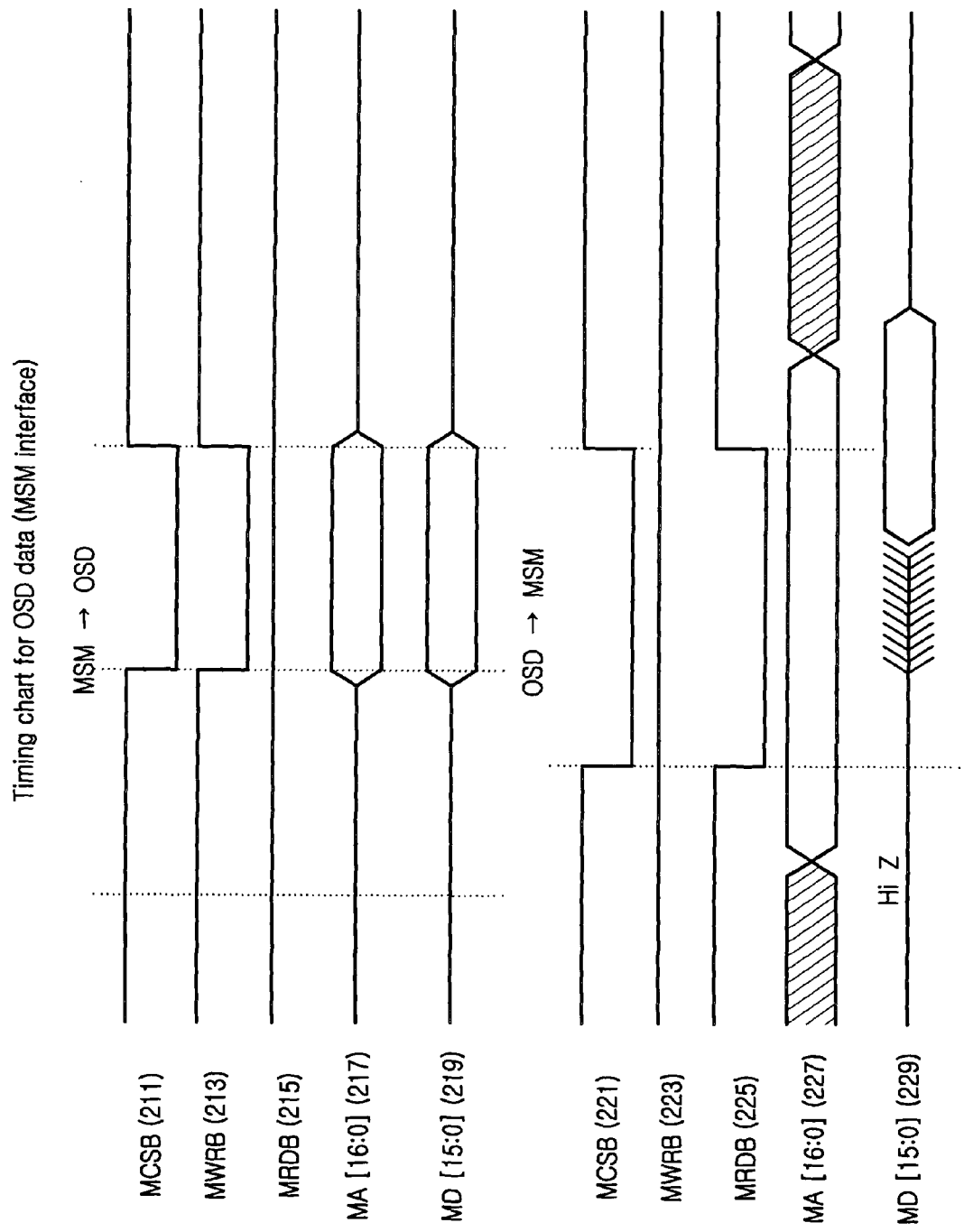
FIG. 4 is a timing diagram illustrating an example of operating characteristics between the control unit and the video processing unit in FIGS. 2 and 3 according to an embodiment of the present invention.

FIG. 3 is a detailed block diagram illustrating an example of the video processing unit 70 in FIGS. 1 and 2, and FIG. 4 shows a data access timing between the control unit 10 and the video processing unit 70.

The operation of the video processing unit 70 will hereinafter be described with reference to FIGS. 3 and 4. An A/D converter 111 converts an analog RGB signal received from the decoder 60 into digital data. In the embodiment of the present invention, the A/D converter 111 is assumed to convert the analog RGB signal into 18-bit digital RGB data (65536 colors).

A format scaler 113 receives the digital RGB data from the A/D converter 111 and a horizontal synchronous signal HSYNC and vertical synchronous signal VSYNC from the decoder 60 and scales the size of the received digital RGB data on the basis of the received synchronous signals. The format scaler 113 performs its scaling operation in the following manner. Firstly, the format scaler 113 determines a display picture size. Secondly, the format scaler 113 sets VXSIZE and VYSIZE of the display picture size with regard to the horizontal and vertical directions. In the embodiment of the present invention, the television video signal is assumed to be scaled within the range of the maximum size of 220*176 pixels to the minimum size of 100*75 pixels. Thirdly, the format scaler 113 sets a scaling (up/down) ratio. Fourthly, the format scaler 113 calculates 720*4096/VXSIZE with respect to the horizontal direction and sets the calculated result as HLSR. The format scaler 113 also calculates 240*2048/VYSIZE with respect to the vertical direction and sets the calculated result as VLSR. In the embodiment of the present invention, the input video signal is assumed to be scaled to the maximum size of 220*176 pixels. Further, the scaler 113 converts the 18-bit RGB data into 16-bit RGB data. The 16-bit data [15:0] is preferably composed of 5-bit R data [15:11], 6-bit G data [10:5] and 5-bit B data [4:0].

Memories 131, 133 and 135 each store data of a frame size (176*220*12 bits). In the television mode, the memory 131 functions to store user data and the memories 133 and 135 function to store video data. In the OSD mode, the memories 131 and 133 function to store user data and the memory 135 functions to store wall paper data.

A memory controller 123 functions to control access to the memories 131, 133 and 135 under the control of the control unit 10. The memory controller 123 controls the memories 131, 133 and 135 separately according to the television mode and the OSD mode of the device. In the television mode, the memory controller 123 stores user data from the control unit 10 in the first memory 131. The memory controller 123 also stores video data of the current frame from the scaler 113 in the second memory 133 (or the third memory 135) and outputs video data of the previous frame stored in the third memory 135 (or the second memory 133). The memory controller 123 stores/outputs television RGB video data in/from the memories 133 and 135 on a frame basis. When storing video data of the current frame in the memory 133, the memory controller 123 outputs video data of the previous frame stored in the memory 135. When storing video data of the current frame in the memory 135, the memory controller 123 outputs video data of the previous frame stored in the memory 133. Namely, when accessing the memories 133 and 135, the memory controller 123 outputs stored previous frame data when storing received frame data, in order to process a television video signal in real time. In other words, because video data of 30 frames per second must be processed for the television video signal display, the memory controller 123 sends the video signal to the display unit 80 in real time using the two frame memories. The memory controller 123 outputs frame video data to the display unit 80 in a frame period (vertical synchronous signal period) and user data stored in the memory 131 to the display unit 80 in an idle period before the start of the next frame, respectively. As a result, the memory controller 123 outputs frame video data stored in the memory 133 or 135 in a video signal active period (one vertical synchronous signal period) of a one-frame video signal display period and user data stored in the memory 131 in an idle period of the display period, respectively.

In the OSD mode, the memory controller 123 accesses user data in the memories 131 and 133 and wall paper data in the memory 135, respectively. At this time, both of the memories 131 and 133 need not be used, and only one thereof may be set and used.

An OSD mixer 125 mixes frame-unit video data from the memory controller 123 with user data therefrom as OSD data and outputs the mixed result to the display unit 80. A timing controller 121 generates a dot clock DOTCLK and synchronous signals (a horizontal synchronous signal HSYNC and a vertical synchronous signal VSYNC) detected in the television mode. The timing controller 121 also establishes the synchronization of pixel data, line data and frame data of output video data from the OSD mixer 125 and transfers the resulting video data to the display unit 80.

A control interface 117 interfaces user data and mode control data between the control unit 10 and the video processing unit 70. In the embodiment of the present invention, the control interface 117 interfaces a 17-bit address and 16-bit data with the control unit 10. A frame memory in the video processing unit 70 is accessed if a most significant bit A16 of the 17-bit address is 1, and a register in the video processing unit 70 is accessed if it is 0. With reference to FIG. 4 for output of data to the video processing unit 70, the control unit 10 selects the video processing unit 70 as indicated by 211 and enables a write mode as indicated by 213. The control unit 10 then outputs an address MA[16:0] as indicated by 217, and user data MD[15:0] as indicated by 219 to the video processing unit 70 to write the user data into a memory location of the video processing unit 70 corresponding to the address. The user data may include current time data, battery level data, reception sensitivity data, television picture control data, mode setting control data, menu data, etc. For access to data from the video processing unit 70, the control unit 10 selects the video processing unit 70 as indicated by 221 and enables a read mode as indicated by 225. The control unit 10 then outputs an address MA[16:0] as indicated by 227 to the video processing unit 70 to access user data MD[15:0] as indicated by 229 from a memory location of the video processing unit 70 corresponding to the address. The control interface 117 performs such an interfacing function that the output of the control unit 10 can be processed by the video processing unit 70 as shown in FIG. 4.

An Inter Integrated Chip (I2C) bus interface 115 has an I2C bus master capable of controlling two slave devices. The I2C interface 115 controls the tuner 50 and decoder 60 under the control of the control interface 117.

An OSD controller (or OSD random access memory (RAM) block copy accelerator) 119 copies a desired rectangular area of user data to a desired position. That is, the OSD controller 119 can block-copy a desired rectangular area of data to a desired position of a displayed television picture according to control data from the control unit 10, transferred by the control interface 117. This block copy function can be performed either in one memory or between two memories. In other words, in the television mode, the block copy function can be performed only in the memory 131. In the OSD mode, the block copy function can be performed in the memory 131, in the memory 133 or between the memories 131 and 133.

The OSD controller 119 can perform the OSD block copy operation in the following manner. Register commands for execution of the block copy function are defined as shown in the table 1. The control unit 10 sets various parameters for the block copy operation and outputs the set parameters to the OSD controller 119. The set parameters are BC_SEL0 and BC_SEL1 indicative of memories to be copied, BCX1 and BCY1 indicative of the left and upper coordinates of a rectangular area to be copied, BCX2 and BCY2 indicative of the right and lower coordinates of the rectangular area to be copied, BCDX and BCDY indicative of X/Y-copy displacements, and BCDXSIG and BCDYSIG indicative of X/Y-copy displacement directions. The block copy operation is executed. In this case, if BC_START is set to 1, the OSD controller 119 can execute the block copy operation according to the set parameters. During the block copy operation, BC_BUSY is set to 1, thus inhibiting the access to the above memories by the control unit 10.

On the basis of the register commands from the control unit 10 as in table 1, as described above, the video processing unit 70 performs a display mode setting function, a display output switching function, a power control function for the memories 131, 133 and 135, an OSD control function, a wall paper setting function, an access memory selection function for the control unit 10, an RGB data inversion function, a block copy function, a screen capture function, a display position adjustment function for the display unit 80, a television (TV) picture rotation function, a TV picture display start position adjustment function, a TV picture scaling function, a brightness/contrast adjustment function and an I2C communication function.

The video processing unit 70 performs a bit allocation function for color expression in the following manner. TV video data from the A/D converter 111 and wall paper data are expressed in 16 bits/pixel. The 16-bit data [15:0] has a bit configuration as in table 2.

TABLE 2

| Color | Data | Bit |
|---|---|---|
| Red | data[15:11] | 5 bits |
| Green | data[10:5] | 6 bits |
| Blue | data[4:0] | 5 bits |

Also, OSD data is expressed in 12 bits. The 12-bit data [11:0] has a bit configuration as in table 3.

TABLE 3

| Color | Data | Bit |
|---|---|---|
| Red | data[11:8] | 4 bits |
| Green | data[7:4] | 4 bits |
| Blue | data[3:0] | 4 bits |

The video processing unit 70 performs the display mode setting function in the following manner. The video processing unit 70 enters the TV mode if the register command TV_MODE is 1 and the OSD mode if it is 0. When the operation mode is the TV mode, the video processing unit 70 utilizes the memory 131 as an OSD memory for access to user data and the memories 133 and 135 as frame memories for access to TV video data, respectively. When the operation mode is the OSD mode, the video processing unit 70 utilizes the memories 131 and 133 as OSD memories for access to user data and the memory 135 as a wall paper memory, respectively. In this case, user data stored in the memory 131 as the OSD memory and user data stored in the memory 133 as the OSD memory cannot be displayed at the same time, and any one thereof is selected according to the register command DISP_SEL.

The video processing unit 70 performs the display output switching function in the following manner. If the register command VIDEOON is 1, the video processing unit 70 displays a video picture on the display unit 80. If the register command VIDEOON is 0, the video processing unit 70 outputs synchronous signals, but outputs a picture of only one color (black) in place of the video picture. In the case where the register command OSDON is 1, the video processing unit 70 displays an OSD picture. However, the video processing unit 70 displays no OSD picture if the register command OSDON is 0. In addition, the video processing unit 70 displays a TV picture if the register command TVON is 1 and a picture of only one color (black) in place of the TV picture if it is 0.

The frame memory power control function is performed in the following manner. The memories 131, 133 and 135 are powered on/off by the register commands RAM0PON, RAM1PON and RAM2PON, respectively. If each register command is set to 1, the corresponding memory is powered on to be available. However, if each register command is set to 0, the corresponding memory is powered off.

The video processing unit 70 performs the OSD control function in the following manner. In the OSD control function, the video processing unit 70 can select an OSD picture in response to the register command DISP_SEL in the OSD mode (TV_MODE=0). The video processing unit 70 displays the contents of the memory 131 as an OSD picture if the register command DISP_SEL is set to 0, and the contents of the memory 133 as an OSD picture if it is set to 1. Also, when the register command WP_DISP is set to 1 in the OSD mode, the video processing unit 70 accesses the contents of the memory 135 and displays the accessed contents as a wall paper. When the register command WP_DISP is set to 0, the video processing unit 70 displays a black picture.

The video processing unit 70 performs the wall paper setting function, more particularly the transparent color setting function, in the following manner. When displaying OSD data and TV video data or wall paper data in an overlap manner, the video processing unit 70 uses a transparent color for the OSD data. To this end, when the OSD data is data set to the register command THRUPTN, the color thereof is processed to be transparent. Where the color of the OSD data is transparent, a TV picture or wall paper is displayed at the corresponding position. The transparent color is valid when the register command THRUEN is 0. If the register command THRUEN is 1, the video processing unit 70 displays an OSD picture of a color designated by the OSD data.

The access memory selection function for the control unit 10 is performed in the following manner. The control unit 10 can access a memory for OSD by outputting a most significant bit (MSB) MA16 of an address as 1. The access is made to an OSD memory location designated by lower-order bits MA15-MA0 of the address. The accessible memory is selectable according to the register command RW_SEL. The control unit 10 can access the memories 131, 133 and 135, respectively, using the register command RW_SEL=0, 1 and 2 in the OSD mode. However, in the TV mode (TV_MODE=1), the control unit 10 can directly access only the memory 131. For TV picture capture, the control unit 10 can read a TV picture from the memory 133 or 135, but not select the memories 133 and 135. In this case, the video processing unit 70 automatically selects a memory for output of a full TV picture and outputs captured data from the selected memory to the control unit 10.

The video processing unit 70 performs the RGB data inversion function in the following manner. If the register command RGBINV is set to 1, the video processing unit 70 inverts the color of OSD data by means of bit inversion and displays the inverted OSD data color. If the register command RGBINV is set to 0, the video processing unit 70 displays the color of OSD data as it is.

The video processing unit 70 performs the OSD block copy function in the following manner. The block copy function is performed by the OSD controller 119 in the video processing unit 70 in response to the associated register commands from the control unit 10. The OSD controller 119 can block-copy a desired rectangular area of data to a desired position. This block copy function can be performed either in one memory or between two memories. In the TV mode (TV_MODE=1), the block copy function can be performed only in the memory 131. In the OSD mode (TV_MODE=0), the block copy function can be performed in the memory 131, in the memory 133 or between the memories 131 and 133. In order to perform the block copy function, the control unit 10 first sets register commands or parameters for the block copy operation and the OSD controller 119 then executes the block copy operation according to the set parameters. The set parameters for the block copy operation are BC_SEL0 indicative of a source memory in which data to be block-copied is stored, BC_SEL1 indicative of a destination memory in which the block-copied data is to be stored, BCX1 and BCY1 indicative of the left and upper coordinates of a rectangular area of the source memory, BCX2 and BCY2 indicative of the right and lower coordinates of the rectangular area of the source memory, BCDX and BCDY indicative of X/Y-copy displacements, and BCDXSIG and BCDYSIG indicative of X/Y-copy displacement directions. If the control unit 10 sets BC_START to 1 after setting the parameters for the block copy operation in the above manner, then the OSD controller 119 executes the block copy operation according to the set parameters. During the block copy operation, BC_BUSY is set to 1, thus inhibiting the access to the above memories by the control unit 10.

The video processing unit 70 performs the TV picture capture function in the following manner. In the TV picture capture function, the video processing unit 70 can capture video data of a TV picture being displayed and output the captured video data to the control unit 10. This TV picture capture function is valid only in the TV mode (TV_MODE=1). The TV picture capture operation is executed as follow. First, the control unit 10 sets the register command RW_SEL to 0 and, during display of a TV picture, sets the register command TV_STOP to 1. As a result, the video processing unit 70 stops the TV picture display. If the video processing unit 70 stops the TV picture display, the control unit 10 reads current video data from a corresponding memory to capture it. If the control unit 10 sets the register command TV_START to 1 after capturing the TV picture, then the video processing unit 70 resumes the TV picture display.

The video processing unit 70 performs the display position adjustment function for the display unit 80 in the following manner. The display position of the display unit 80 can be finely adjusted on the basis of the register commands YADJ and XADJ. The register commands YADJ and XADJ are each composed of 4 bits, which are expressed by a two's complement. The register command YADJ ranges from +7 to −2, wherein the sign "−" represents the upward direction and "+" represents the downward direction. The register command XADJ ranges from +1 to −8, wherein the sign "−" represents the left direction and "+" represents the right direction.

The video processing unit 70 performs the TV picture rotation function in the following manner. The video processing unit 70 can rotate a TV picture being displayed. The TV picture rotation function is enabled by setting the register command TV_ROT to a desired value. In the case of TV_ROT=0, 1, 2 and 3, the video processing unit 70 rotates a TV picture being displayed, respectively, by 0°, 90°, 180° and 270° or substantially 0°, substantially 90°, substantially 180° and substantially 270°.

The video processing unit 70 performs the TV picture display start position adjustment function in the following manner. The video processing unit 70 can make a relative display position adjustment of an input analog RGB signal to synchronous signals. With regard to the horizontal direction, the video processing unit 70 can adjust the actual display position from a downward position of HSYNC by adjusting the register command TVHPOS although it has the initial value of 124. The smaller the register command TVHPOS, the closer the actual display position is to the downward position of HSYNC. Similarly, the video processing unit 70 can adjust the actual display position with regard to the vertical direction by adjusting the register command TVVPOS.

The video processing unit 70 performs the TV picture brightness/contrast adjustment function in the following manner. The video processing unit 70 can adjust the brightness and contrast of a TV picture being displayed, respectively, by setting the register commands BRIGHT and CONTRAST to desired values. The register command BRIGHT is 6 bits long, which are expressed by a two's complement. The register command CONTRAST is composed of a positive integer. By setting the register commands BRIGHT and CONTRAST to desired values, the video processing unit 70 can perform the following calculation with respect to respective RGB signals being displayed.

LCD OUTPUT=(TV INPUT+BRIGHT)*CONTRAST/128

The video processing unit 70 performs the TV picture scaling function in the following manner. This scaling function is performed by the format scaler 113 in the video processing unit 70. The scaler 113 executes the scaling operation in the following order. Note that register settings which are described below are given in consideration of horizontality and verticality when the TV picture stays at 0° or substantially 0°, irrespective of rotation of the TV picture. Firstly, the format scaler 113 sets a desired display picture size. Namely, the scaler 113 sets VXSIZE and VYSIZE of the desired display picture size with regard to the horizontal and vertical directions, which size is 100*75 pixels at minimum. Secondly, the scaler 113 sets a display start position. Namely, the scaler 113 sets the display start position of the TV picture with TV_XPOS and TV_YPOS. Thirdly, the format scaler 113 sets a scaling (up/down) ratio. At this time, the scaler 113 calculates 720*4096/VXSIZE with respect to the horizontal direction and sets the calculated result as HLSR. The format scaler 113 also calculates 240*2048/VYSIZE with respect to the vertical direction and sets the calculated result as VLSR.

The above-described video processing functions, other than the block copy function and scaling function, are performed by the memory controller 123 in the video processing unit 70 on the basis of the associated register commands from the control unit 10.

Figure 5:
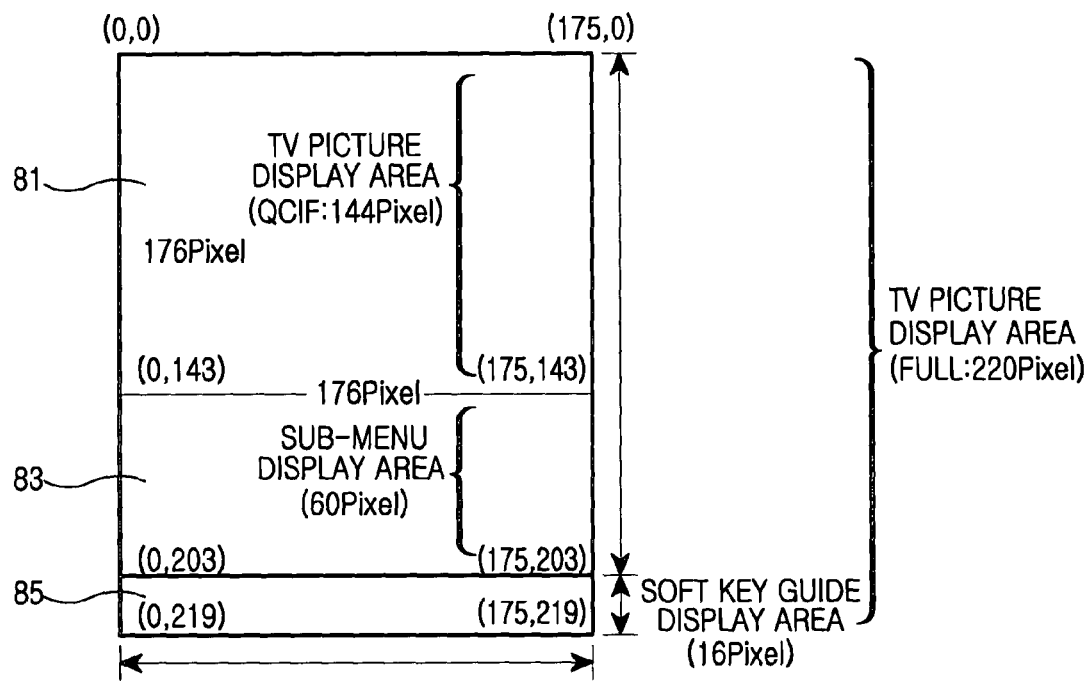
FIG. 5 is a view showing diagram illustrating an example of a television video signal display area of a display unit in FIG. 1 according to an embodiment of the present invention.

FIG. 5 shows display areas of the display unit 80 in FIG. 1. The display unit 80 has a first display area 81 for displaying TV video data in the TV mode and a second display area 83 for displaying user data in the TV mode. The display unit 80 further has a third display area 85 for displaying soft key information for menu setting in the television mode or OSD mode. In the embodiment of the present invention, the display unit 80 is assumed to have the first to third display areas 81-85. The first display area 81 displays a TV picture of a quarter common intermediate format (QCIF) size from the memory 133 or 135 and the second display area 83 displays user data from the memory 131. The third display area 85 displays soft keys to guide them. In the embodiment of the present invention, the display areas of the display unit 80 are assumed to have their respective sizes as shown in FIG. 5. The QCIF picture has a size of 176*144 pixels and is displayed in the first display area 81 in the normal state. A full picture displayed on the entire screen of the display unit 80 has a size of 176*220 pixels.

In FIG. 5, the second display area 83 displays user data and sub-menus and has a size of 60*176 pixels. If the entire size of the second display area 83 is set to font size (18*19 pixels)*3 rows, the total 60 character data (60 pixels) can be displayed in the second display area 83. In this case, provided that the size of three character data is used for a margin, the total 57 character data will be able to be displayed in the second display area 83. Also, provided that user data and menu items are stored in the memory 131 according to the characteristics of the second display area 83, they will be able to be efficiently displayed in the TV mode.

Figure 6:
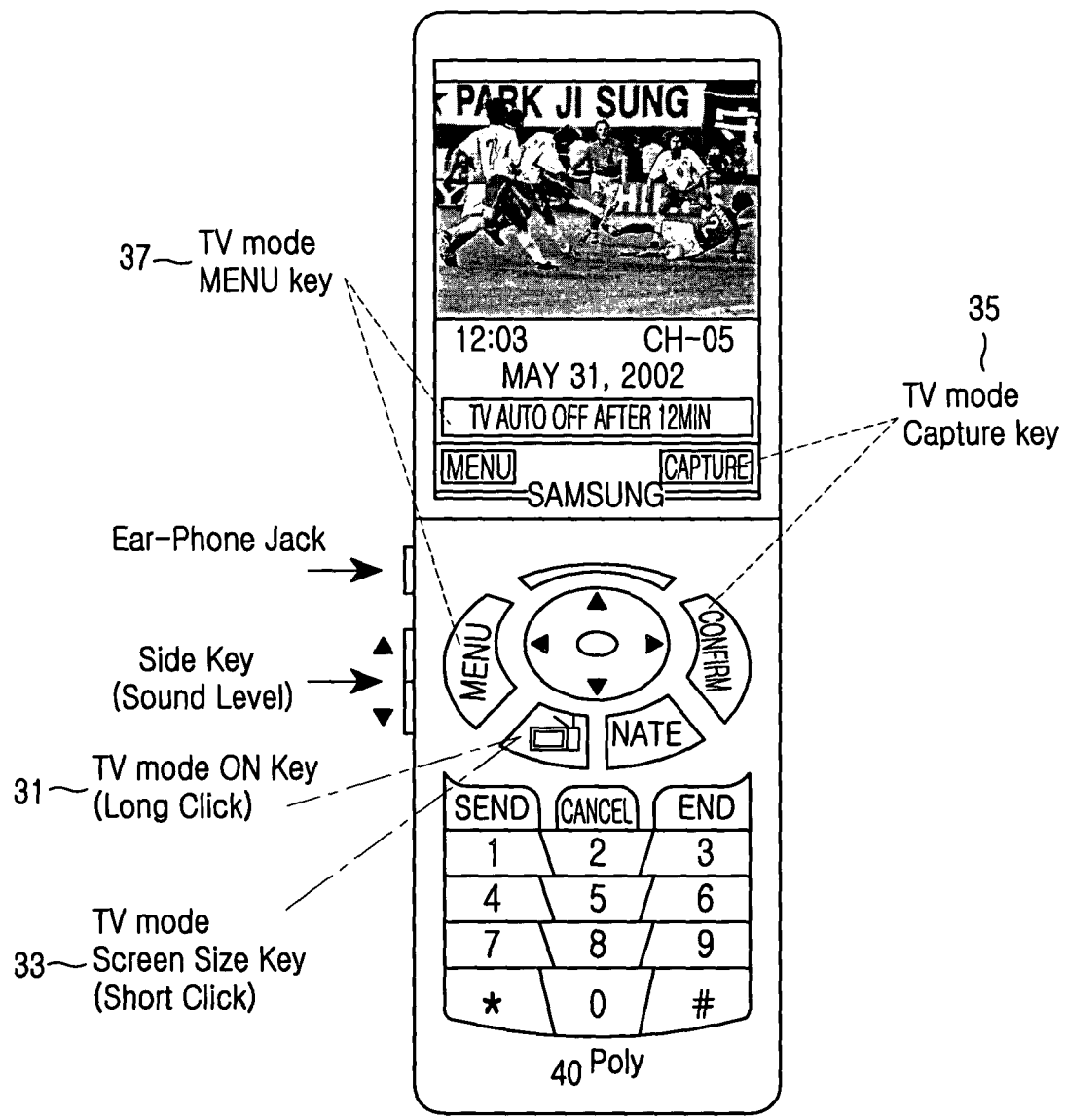
FIG. 6 is a block diagram illustrating an example of the configurations of a keypad and the display unit in FIG. 1 according to an embodiment of the present invention.

FIG. 6 is a block diagram illustrating an example of configurations of the keypad 27 and display unit 80 according to the embodiment of the present invention.

In the configuration of the keypad 27, a TV mode ON key 31 is used to set the mobile telephone to the TV mode. If the user clicks on a TV key for a long period of time in the standby mode, the control unit 10 determines the key input to be a TV mode ON key input. A TV mode screen size key 33 is used to change the size and direction of a TV picture displayed on the display unit 80. If the user clicks on the TV key for a short period of time in the TV mode, the control unit 10 determines the key input to be a TV mode screen size key input. Although the embodiment of the present invention has been disclosed for illustrative purposes to implement one TV key for the TV mode ON key operation and TV mode screen size key operation, individual keys may be used for the TV mode ON key operation and TV mode screen size key operation. If the user clicks on a confirm key or capture key when a TV picture is displayed in the TV mode, the control unit 10 determines the clicked key to be a TV mode capture key 35. A TV mode menu key 37 functions to set the TV mode or adjust a channel, screen or timer under the condition that the TV mode is set.

According to the embodiment of the present invention, the keypad can be implemented as shown in table 4.

TABLE 4

| Key | Method | Function | Remark |
| --- | --- | --- | --- |
| TV | long click | set (start) TV mode | |
| Menu | short click | display various menus related to TV function | soft key guide display |
| TV | short click | select TV picture size and display direction | no guide display |
| Confirm | short click | capture TV picture as still picture | soft key guide display |
| Navigation ◀▶ | | manually select channel | |
| Navigation ▲▼ | | select automatic channel | |
| Numeric | | select channel by channel number input | |

TABLE 4-continued

| Key | Method | Function | Remark |
| --- | --- | --- | --- |
| Cancel | short click | return to upper menu | |
| Exit | short click | exit from TV mode and return to standby picture | |

Figure 7:
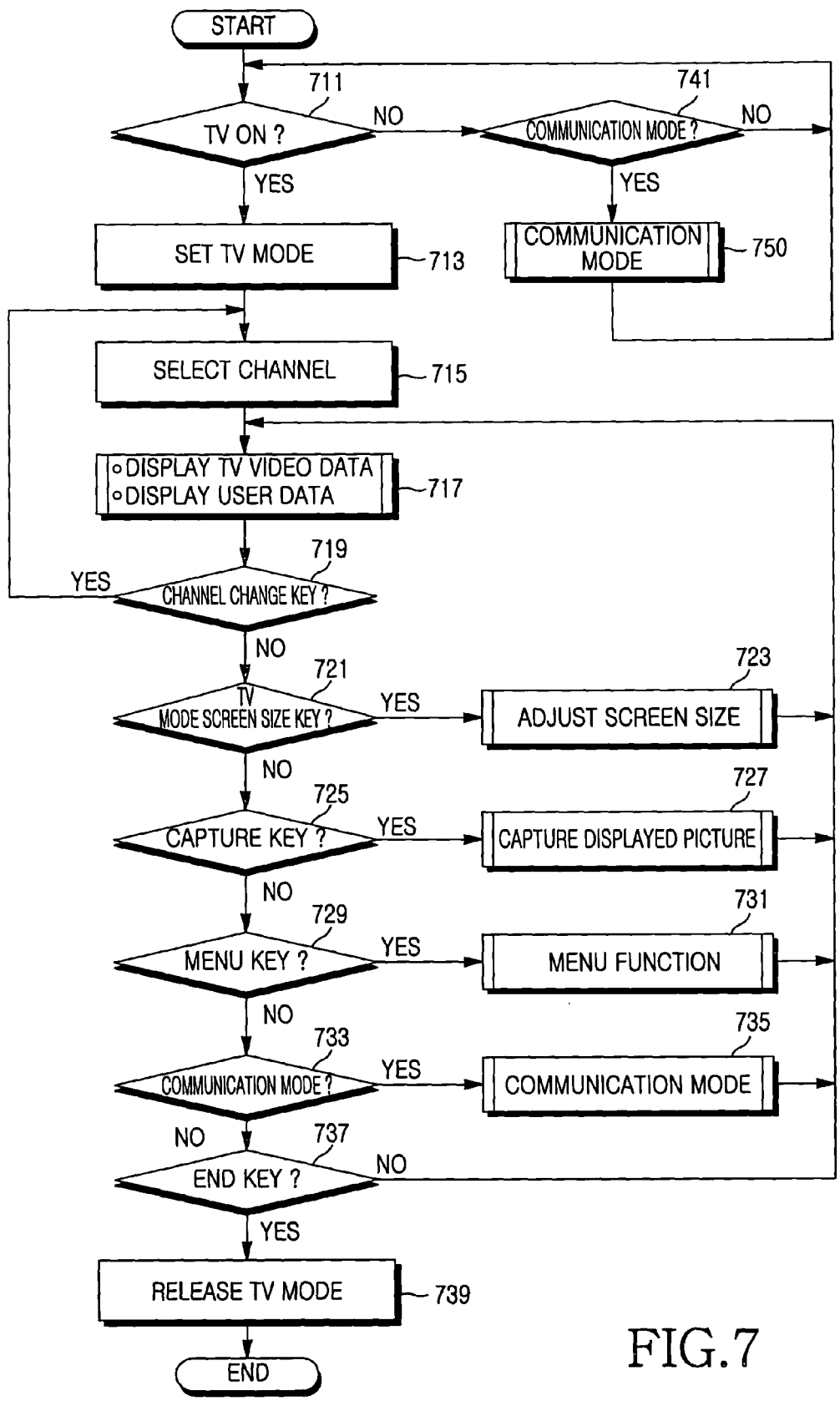
FIG. 7 is a flow chart illustrating an example of a method for displaying a television video signal according to the embodiment of the present invention according to an embodiment of the present invention.

FIG. 7 is a flow chart illustrating an example of a method for displaying a television video signal according to the embodiment of the present invention.

With reference to FIG. 7, if the communication mode is set in the standby mode at step 741, the control unit 10 performs the set communication mode at step 750. Here, the communication mode can be a voice communication mode, a text communication mode or an Internet-based data communication mode. The communication mode will hereinafter be described for illustrative purposes to be the voice communication mode or the text communication mode, more particularly a short message service (SMS) mode. If the communication mode is set, the control unit 10 notifies the video processing unit 70 of the setting of the communication mode and the selection of the OSD mode and transfers user data generated in the communication mode to the video processor 70, at step 750. Then, the memory controller 123 in the video processing unit 70 utilizes the memories 131 and 133 for storage of user data and the memory 135 for storage of wall paper data, respectively. The video processing unit 70 displays the user data from the control unit 10 in the first and second display areas 81 and 83 of the display unit 80.

On the other hand, the user can move the mobile telephone from the standby mode to the TV mode directly or through menu selection. Firstly, in order to set the TV mode directly, the user clicks on the TV key for a long period of time. Upon receiving the TV key input in the standby mode, the control unit 10 determines the received TV key input to be a TV mode setting input. Secondly, when the user clicks on the menu key, the control unit 10 sends user data corresponding to menus to the video processing unit 70 to display the menus on the display unit 80. Thereafter, if the user selects a TV watch menu from among the menus displayed on the display unit 80, the controller 10 determines the TV watch menu selection to be a TV mode setting input. Here, the TV mode refers to a state where the TV receiver is in operation. Moreover, if the menu key is input when the TV mode is set in the above manner, the control unit 10 performs a control operation to display a selected menu while displaying a TV picture.

First, if the TV key is long-clicked in the standby mode, the control unit 10 detects the TV key input at step 711 and sets the TV mode at step 713. The control unit 10 then outputs a TV mode setting command to the video processing unit 70. In response to the TV mode setting command, the video processing unit 70 sets the memory 131 as a memory for storage of user data and the memories 133 and 135 as frame memories for storage of TV video data, respectively, as stated previously. At step 715, the control unit 10 outputs control data for TV channel selection, which is then transferred to the tuner 50 via the control interface 117 and I2C bus master. If there is no channel selected after the TV mode is set, the control unit 10 outputs channel control data to the tuner 50 to access a channel selected in the previous state.

The tuner 50 tunes to a selected channel, receives a television video signal over the tuned channel and performs a frequency conversion operation with respect to the received television video signal. The decoder 60 decodes the television video signal from the tuner 50 to output an analog RGB video signal and synchronous signals. The A/D converter 111 converts the analog video signal from the decoder 60 into digital video data, and the format scaler 113 scales the size of the digital video data from the A/D converter 111 to a predetermined size. The memory controller 123 stores user data from the control unit 10 in the memory 131. The memory controller 123 also outputs digital video data of the previous frame stored in the memory 135 or 133 at the same time that it stores video data of the current frame from the format scaler 113 in the memory 133 or 135. Upon completing the output of video data of one frame, the memory controller 123 outputs user data stored in the memory 131. That is, the memory controller 123 outputs frame video data in a video signal active period of a one-frame video signal display period and user data in an idle period of the display period, respectively. Thereafter, upon receiving video data of the next frame, the memory controller 123 outputs digital video data of the previous frame stored in the memory 133 or 135 at the same time as storing the received video data in the memory 135 or 133. Therefore, the memory controller 123 performs the write and read operations of the frame memories 133 and 135 at the same time, thereby making it possible to display a received video signal in real time.

As stated above, at step 717, the control unit 10 controls the video processing unit 70 to display received video data, and outputs user data corresponding to the received video data to the video processing unit 70 to display the user data. At this time, a television picture output from the video processing unit 70 is a QCIF picture. As a result, the display unit 80 displays, as shown in view A of FIG. 8, the QCIF picture in its first display area 81, user data in its second display area 83 and a soft key guide in its third display area 85, respectively.

Upon receiving a channel change key input at step 719 under the condition that the received TV video signal is displayed in the above manner, the control unit 10 changes the current channel to a new channel at step 715 and then repeats the above step 717. For channel change, if the TV mode is executed, the user can input a desired channel number directly using numeric keys, or select a desired channel using left and right keys of the navigation key. In addition, for channel change in the menu mode, the user can select an automatic channel menu in the menu mode and then select a desired channel number using up and down keys of the navigation key.

If the TV mode screen size key is input at step 721 under the condition that the received TV video signal is displayed, then the control unit 10 outputs a screen adjustment command to the video processing unit 70 at step 723 to adjust the size of a TV picture and rotate the TV picture. Here, the TV picture has any one of two types of sizes, a full size (220*176) and a scaled-down size (QCIF size: 176*144), as described above. The picture rotation can be made by 0°, 90° or 270° or substantially 0°, substantially 90°, or substantially 270°. When the TV mode is started, a TV picture of the QCIF size, which is set as a default, is displayed as shown in view A of FIG. 8. If the TV key is short-clicked under the condition that the TV picture is displayed as shown in view A of FIG. 8, the control unit 10 determines the TV key input to be a TV mode screen size key input and then commands the video processing unit 70 to rotate the TV picture by 90° or substantially 90° and display it at the full size, as shown in view B of FIG. 8. Thereafter, if the TV key is short-clicked again, the control unit 10 commands the video processing unit 70 to rotate the TV picture by 270° or substantially 270° and display it at the full size, as shown in view C of FIG. 8. If the TV key is short-clicked again when the TV picture is displayed as shown in view C of FIG. 8, the control unit 10 controls the video processing unit 70 to display the TV picture at the QCIF size as shown in view A of FIG. 8.

Figure 8:
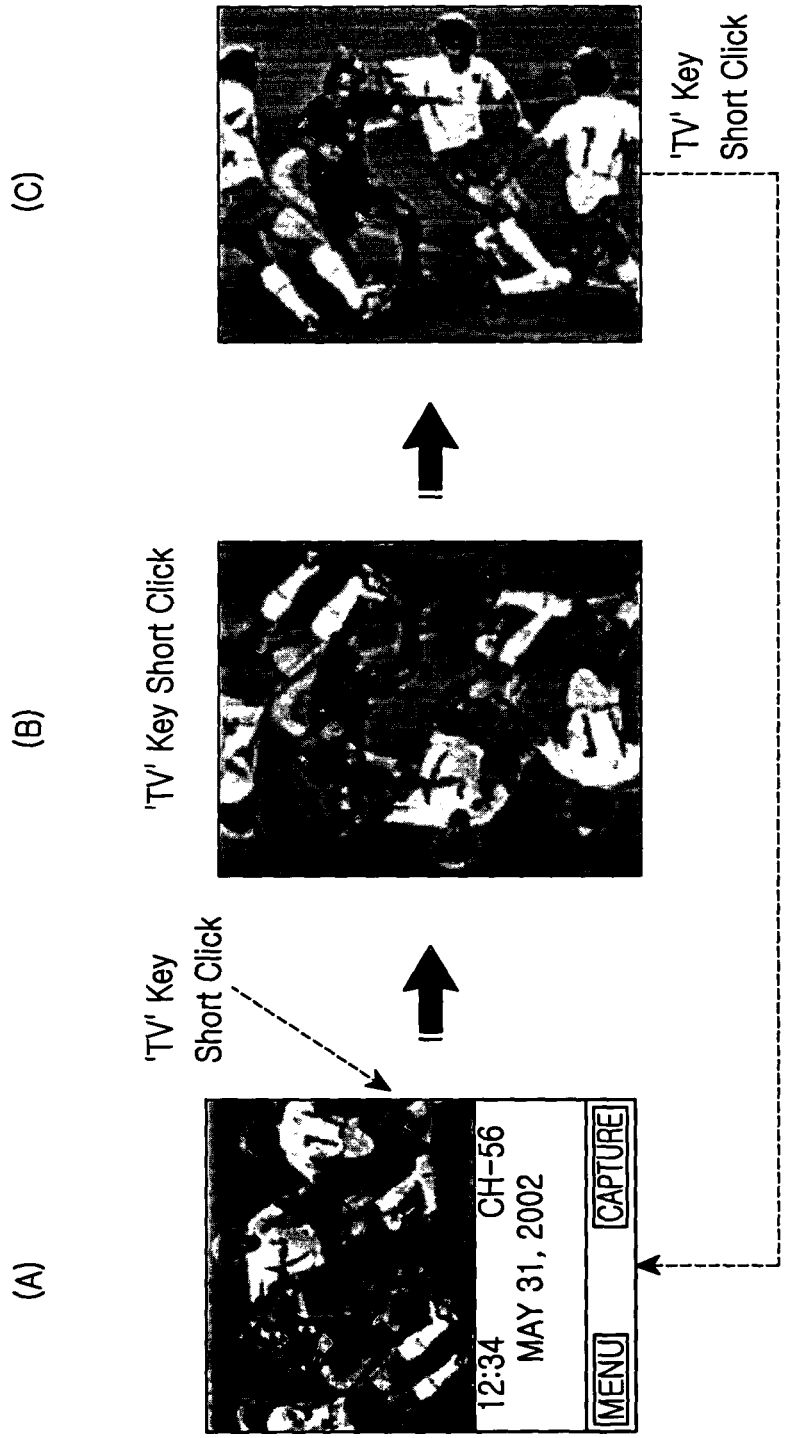
FIG. 8 illustrates examples of display states of the display unit when a television picture is scaled up and rotated in FIG. 7 according to an embodiment of the present invention.

When the QCIF-size picture as shown in view A of FIG. 8, it is effective to set various menus associated with the TV mode and execute a direct access function. However, in the case of the full-size picture (full size_90° or full size_270°) as shown in view B or C of FIG. 8, the control unit 10 commands the video processing unit 70 not to display user data. As a result, when the full-size picture is displayed, user data and soft key data are not displayed in the second display area 83 and third display area 85 of the display unit 80. This enables the user to view the full-size TV picture. Even though no menu key is displayed in the soft key guide display area, or the third display area 85, the control unit 10 provides the menu service if the user pushes the menu key on the keypad 27.

Where the TV mode capture key is input in the TV mode at step 725, the control unit 10 outputs a screen capture command to the video processing unit 70 at step 727. The TV mode capture key can be driven by selecting the confirm key on the keypad 27 or the capture key displayed in the soft key guide display area, or the third display area 85 of the display unit 80, as shown in FIG. 6. The screen capture function is performed to capture and store a TV picture being displayed in the TV mode as a still picture. The TV picture can be captured either when it is displayed at the QCIF size as shown in view A of FIG. 8 or when it is displayed at the full size as shown in view B or C of FIG. 8, but the captured picture must be stored at the QCIF size. The reason is to standardize the sizes of captured pictures into a data size necessary for setting of a wall paper of the terminal as shown in view A of FIG. 9. Alternatively, the sizes of captured pictures may be set to the full size.

Figure 9:
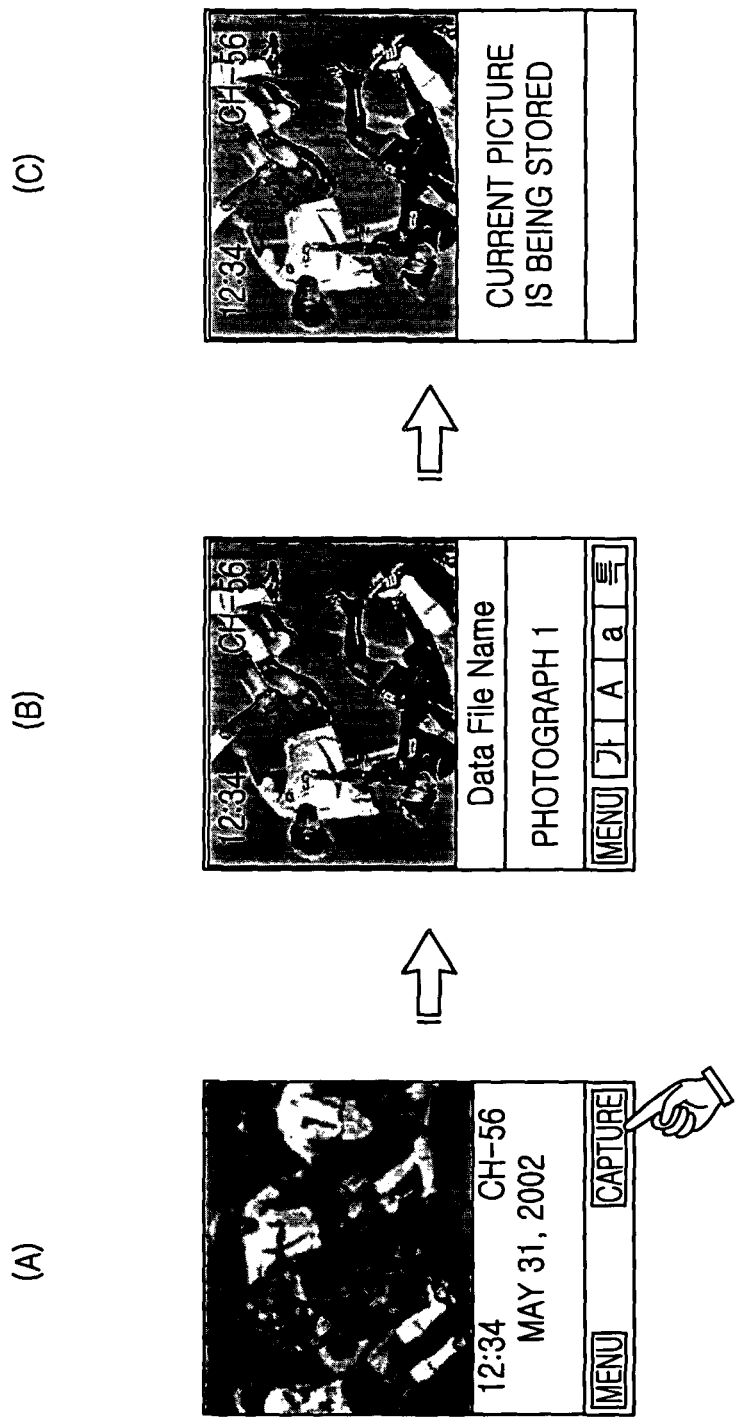
FIG. 9 illustrates examples of display states of the display unit when a television picture is captured in FIG. 7 according to an embodiment of the present invention.

If the user clicks on the capture key displayed in a right portion of the soft key guide display area of the display unit 80 as shown in view A of FIG. 9 or the confirm key on the keypad 27 under the condition that the TV mode is executed, the control unit 10 determines the screen capture mode to be selected and then outputs the screen capture command to the video processing unit 70. In response to the screen capture command, the video processing unit 70 continuously accesses video data of the currently displayed frame to maintain the output thereof, so that the display unit 80 displays the output video data from the video processing unit 70 as a still picture. Video data of a TV picture, captured and displayed as a still picture in this manner, can be accessed by the control unit 10. That is, the control unit 10 can access video data output as a still picture by the video processing unit 70, give a name to the still picture and then store the still picture in the form of a photograph. The views A, B, and C of FIG. 9 illustrate a procedure of storing a photograph acquired after capture. If the user clicks on the capture key when a TV picture is displayed as shown in view A of FIG. 9, the TV picture is displayed as a still picture as shown in view B of FIG. 9. If the user clicks on the confirm key under the condition that the TV picture is displayed as the still picture as shown in view B of FIG. 9, the control unit 10 accesses and stores output video data from the video processing unit 70 as shown in view C of FIG. 9. When the picture to be stored after capture is displayed as shown in FIG. 9*b*, the control unit 10 displays names set as defaults (for example, photograph 1, photograph 2, photograph 3, . . . ) in the second display area 83 of the display unit 80, which state is a character input waiting state. In this state, the user can input a photograph name in the second display area 83 in Korean or English. Alternatively, if there is no separate name input from the user, the control unit 10 may store the still picture with any one of the names set as the defaults. If the user clicks on the confirm key under the condition of inputting a photograph name after TV picture capture, the control unit 10 displays on the display unit 80 the fact that the current picture is being stored, as shown in view C of FIG. 9. If the photograph storage is ended, then the control unit 10 returns to the above step 717 to perform the TV picture display function.

The user can perform various functions by selecting various menus while the received television video signal is displayed in the TV mode as described above. If the user clicks on the menu key at step 729, the control unit 10 displays menus at step 731. Thereafter, the control unit 10 provides a service of a function associated with one of the displayed menus selected by the user and then returns to the above step 717.

Figure 10:
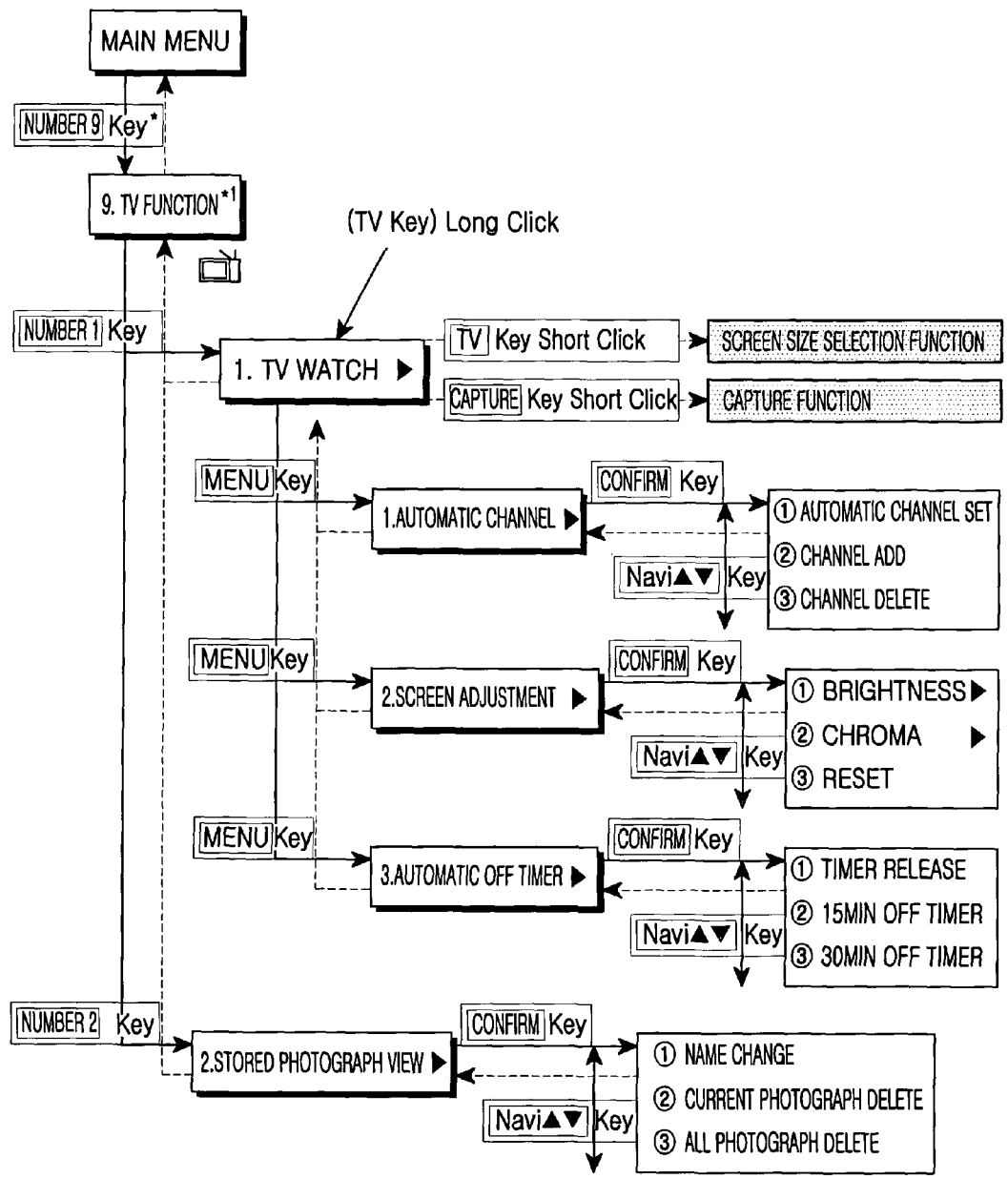
FIG. 10 is a block diagram illustrating examples of menus provided in a television picture display state in FIG. 7 according to an embodiment of the present invention.

FIG. 10 shows functions and menus of keys for provision of function services in the TV mode. First, if the user clicks on the menu key, main menu items of the mobile telephone are displayed. If a TV menu item is selected from among the displayed menu items, menu items "TV watch" and "stored photograph view" are displayed as shown in FIG. 10. When the TV watch menu item is selected, menu items "automatic channel", "screen adjustment" and "automatic off timer" are displayed. When the stored photograph view menu is selected, menu items "name change", "current photograph delete" and "all photograph delete" are displayed.

Figure 11A:
FIGS. 11A and 11B illustrate examples of display states of the display unit when a menu service is provided in FIG. 7 according to an embodiment of the present invention.
Figure 11B:
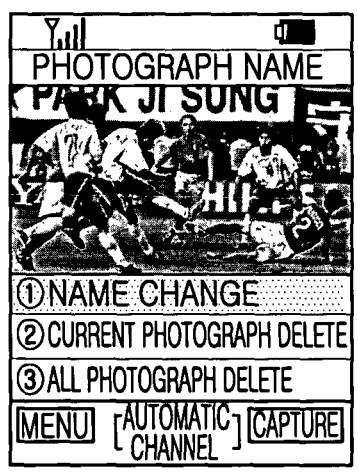

If the menu key input is generated in the TV mode (where either a QCIF screen or full screen can be displayed), the control unit 10 commands the video processing unit 70 to display a QCIF screen on the display unit 80. Then, the video processing unit 70 outputs video data at the QCIF size, outputs menu items to the second display area 83 and displays soft keys in the third display area 85, as shown in FIGS. 11A and 11B. FIG. 11A shows a menu screen in the TV mode and FIG. 11B shows a menu screen in a stored photograph display mode.

With reference to FIG. 11A, whenever the menu key is clicked one time in the TV mode, a selectable menu item among the menu items in the second display area 83 is displayed with a different color from that of the others, and also in a central portion of the third display area 85. The current time is displayed in an upper left portion of the first display area 81 and a channel number of a selected picture is displayed in an upper right portion thereof. This current time and channel number can be provided by the block copy function which is performed by the OSD controller 119 as stated previously. If a select key is clicked under the condition that the menu items are displayed as shown in FIG. 1A, the control unit 10 proceeds to the next step to execute a function of the selected menu item.

With reference to FIG. 11B, in the stored photograph display mode, a stored photograph is displayed in the first display area 81 in place of a TV picture. If the menu key is clicked, sub-menus are displayed on the menu screen of the second display area 83. Also, soft keys are displayed in the third display area 85 and a photograph name is displayed in an upper portion of the first display area 81. Similarly, the photograph name can also be provided by the block copy function.

As an alternative, the user may select a desired menu item on each of the menu screens as shown in FIGS. 11A and 11B by inputting a numeric key. If the mobile telephone returns to the TV mode after the confirm key or cancel key is clicked or a confirm message is displayed after a desired menu item is selected, then it performs the TV mode at the predetermined original screen size.

On the other hand, if the communication mode occurs under the condition that the TV mode is performed, the control unit 10 must be able to perform the communication mode preferentially. The communication mode generally includes an outgoing call mode and an incoming call mode. The communication mode can also be classified into a voice communication mode, a text communication mode and a data communication mode. The data communication mode can be performed over a wireless/wired Internet network. If the communication mode occurs in the TV mode, the control unit 10 can perform the communication mode when performing the television mode, or make a transition from the television mode to the OSD mode and then perform the communication mode in the OSD mode. Alternatively, the control unit 10 may stop the television mode, perform the communication mode and then return to the television mode. In the embodiment of the present invention, it is assumed that, if the communication mode occurs in the television mode, the control unit 10 provides a communication service associated with the communication mode while performing the television mode or OSD mode based on the user's selection.

First, if the communication mode occurs at step 733, the control unit 10 notifies the video processing unit 70 of the occurrence of the communication mode and then controls the video processing unit 70 to perform the communication mode at step 735. At this time, the control unit 10 also notifies the video processing unit 70 of information associated with the television mode or OSD mode according to the user's selection. Then, the video processing unit 70 performs the communication mode during the television mode or during the OSD mode selected by the user. In the television mode, the video processing unit 70 utilizes the memories 133 and 135 as frame memories for storage of television video data and the memory 131 as a memory for storage of user data, respectively. In the OSD mode, the video processing unit 70 utilizes the memories 131 and 133 for storage of user data and the memory 135 for storage of wall paper data, respectively. Also, in the television mode, when a television picture based on the screen adjustment mode is displayed on the display unit 80, the control unit 10 controls the OSD controller 119 in the video processing unit 70 to display user data generated in the communication mode on the television picture in the OSD manner.

The TV mode is released by clicking on an end key (power key) under the condition that the TV mode is executed. If the end key input is generated at step 737, the control unit 10 proceeds to step 739 to output a TV exit command to the video processing unit 70 and then release the TV mode.

Figure 12A:
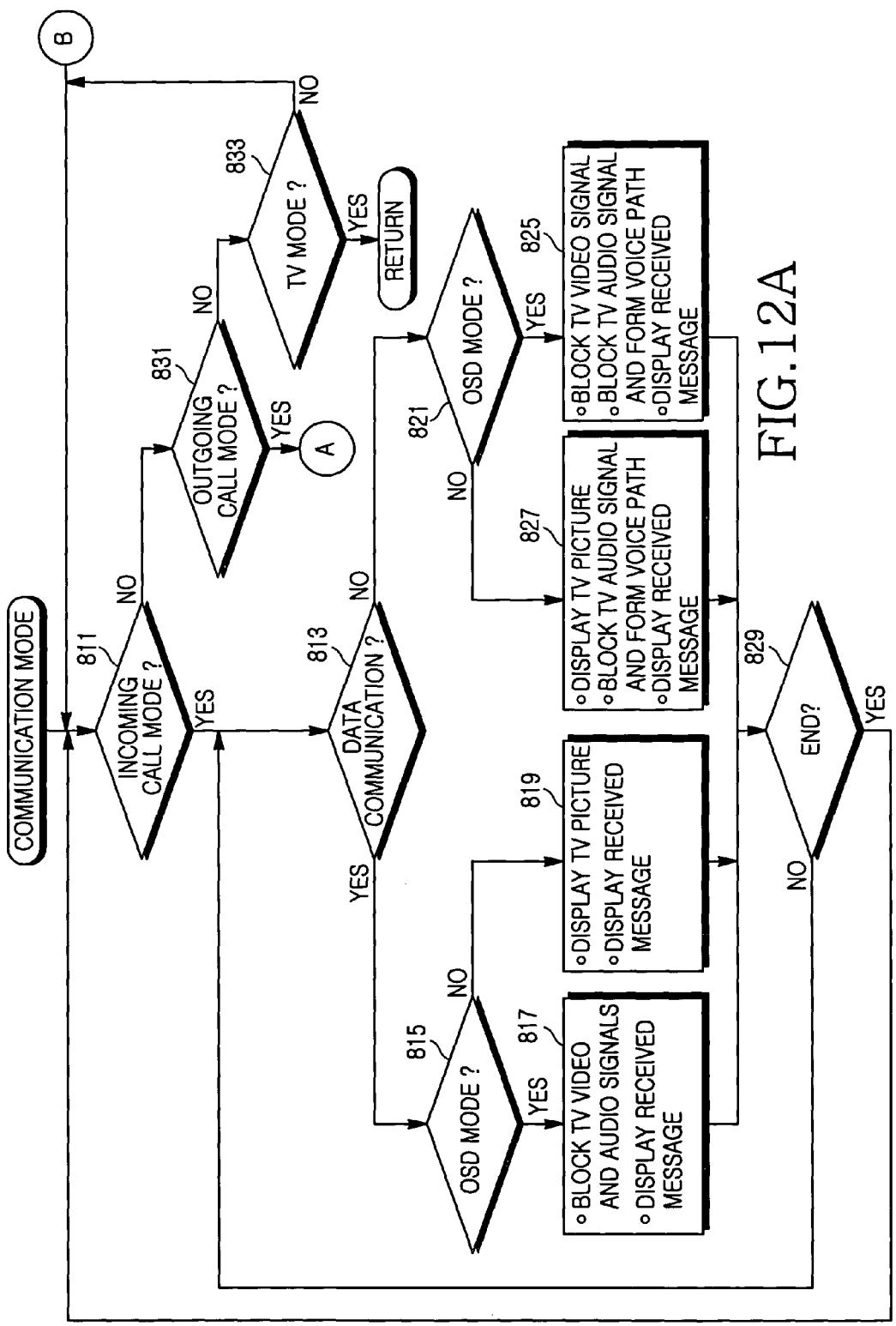
FIGS. 12A and 12B are flow charts illustrating examples of a communication mode execution step in FIG. 7 according to an embodiment of the present invention.
Figure 12B:
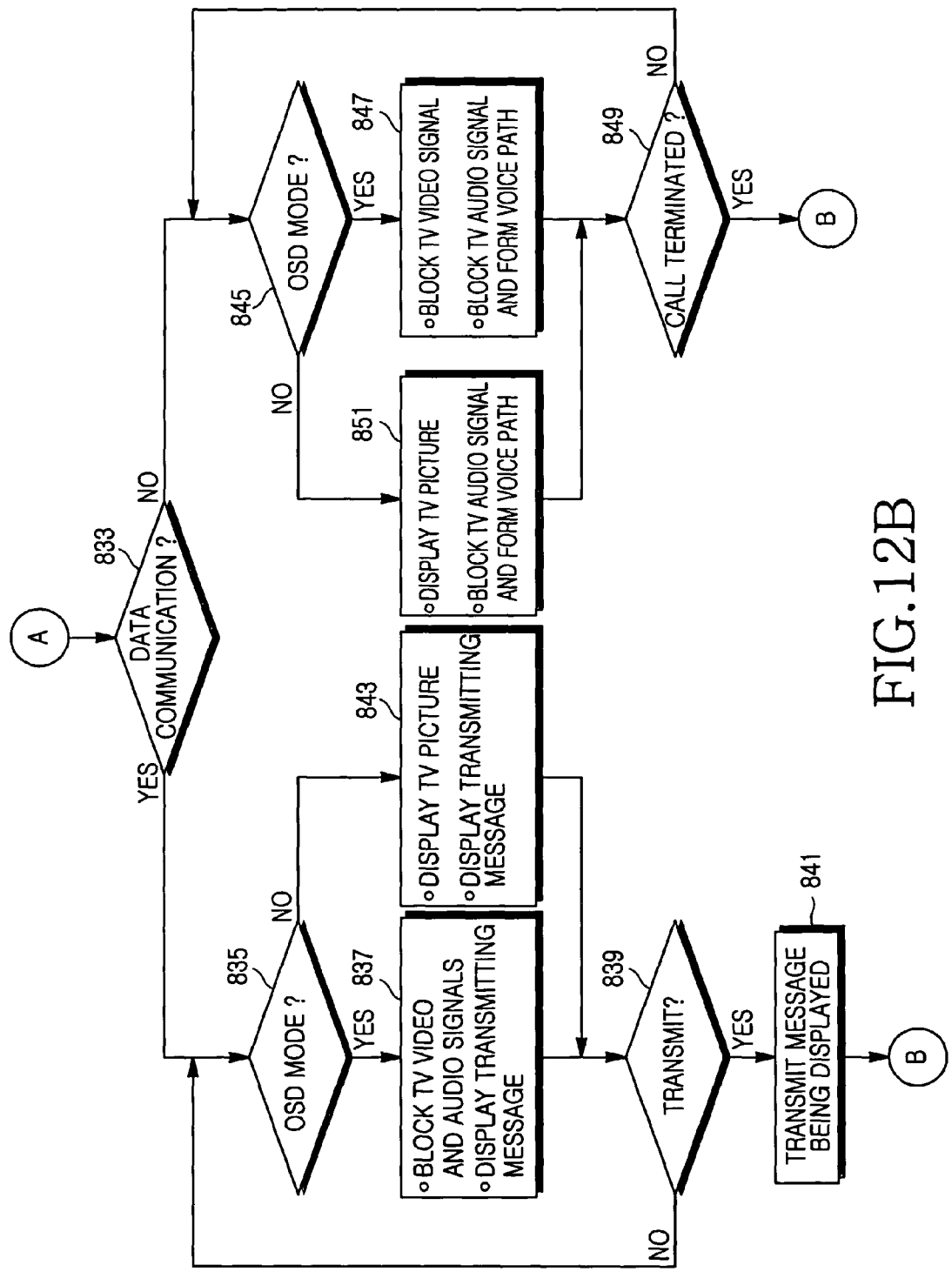
Figure 13A:
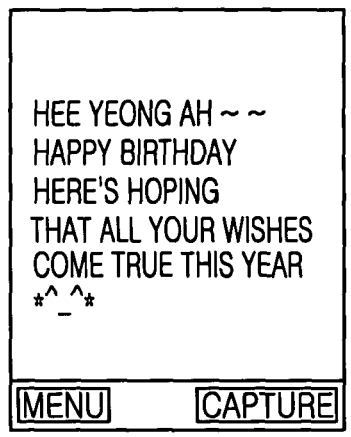
FIGS. 13A to 13C are diagrams examples of display states of the display unit when a communication mode is executed in FIGS. 12A and 12B according to an embodiment of the present invention.
Figure 13B:
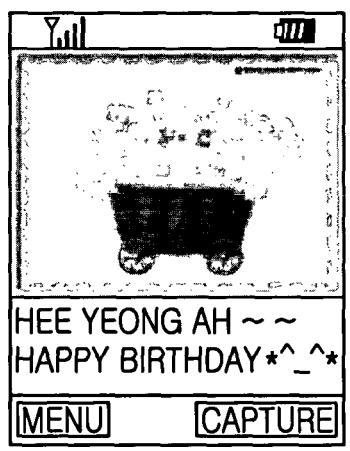
Figure 13C:
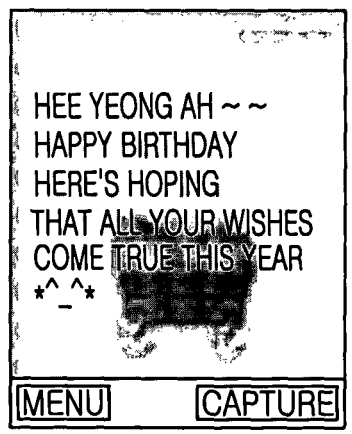

FIGS. 12A and 12B are flow charts illustrating examples of a procedure of performing the communication mode in the television mode according to an embodiment of the present invention, and FIGS. 13A to 13C are diagrams illustrating examples of user data generated when the communication mode is performed in FIGS. 12A and 12B according to an embodiment of the present invention. It is assumed here that the communication mode is either a voice communication mode or a data communication mode such as a text communication mode.

First, in order to conduct the communication mode when the television mode is performed, the user has to select a display mode also. Namely, the user must select whether to conduct the communication mode in the television mode or to change the television mode to the OSD mode and then conduct the communication mode in the changed OSD mode. Therefore, if the communication mode is selected during the television mode, the control unit 10 determines whether the communication mode is an incoming call mode or outgoing call mode and whether it is a voice communication mode or data communication mode. The control unit 10 also determines whether the display mode of displaying user data generated in the communication mode will be performed in the current television mode or the OSD mode.

A detailed description will hereinafter be given of the procedure of performing the communication mode in the television mode with reference to FIGS. 12A and 12B and FIGS. 13A to 13C. Firstly, in the case where the communication mode is the incoming call mode at step 811 and the data communication mode at step 813 and the OSD function is selected in the data communication mode at step 815, the control unit 10 notifies the video processing unit 70 of information regarding these modes at step 817. Also at step 817, the control unit 10 transfers incoming data to the video processing unit 70. Then, the I2C interface 115 in the video processing unit 70 controls the tuner 50 and decoder 60 under the control of the control unit 10 such that they are not operated. Also, the memory controller 123 in the video processing unit 70 stores user data from the control unit 10 in the memories 131 and 133 and wall paper data in the memory 135, respectively. When no wall paper information selected, a wall paper is displayed with a transparent color on the basis of predetermined wall paper information. Therefore, the video processing unit 70 displays the user data from the control unit 10 in the first and second display areas 81 and 83 of the display unit 80, as shown in FIG. 13a. Here, the user data may include, for example, caller information and a text message sent from a calling party.

Secondly, if the communication mode is the incoming call mode at step 811 and the data communication mode at step 813 and the television display function is selected in the data communication mode at step 815, the control unit 10 notifies the video processing unit 70 of information regarding these modes at step 819. Also at step 819, the control unit 10 transfers incoming data to the video processing unit 70. Then at step 819, the video processing unit 70 stores user data from the control unit 10 in the memory 131 and received television video data in the memories 133 and 135, respectively. At this time, provided that the television video data is being displayed at the QCIF size, the video processing unit 70 controls the display unit 80 to display the television video data in the first display area 81 of the display unit 80 and the user data from the control unit 10 in the second display area 83 thereof, respectively, as shown in FIG. 13C. Here, the user data may include, for example, caller information and a text message sent from a calling party. Alternatively, provided that the television video data is being displayed at the full size, the video processing unit 70 displays a text message from the OSD controller 119 on a displayed picture in the OSD manner, as shown in FIG. 13B.

Thirdly, if the communication mode is the incoming call mode at step 811 and the voice communication mode at step 813 and the OSD function is selected in the voice communication mode at step 821, the control unit 10 notifies the video processing unit 70 of information regarding these modes at step 825. Then, the I2C interface 115 in the video processing unit 70 controls the tuner 50 and decoder 60 under the control of the control unit 10 such that they are not operated. Also, the memory controller 123 in the video processing unit 70 stores user data from the control unit 10 in the memories 131 and 133 and wall paper data in the memory 135, respectively. When no wall paper information is selected, a wall paper is displayed with a transparent color on the basis of predetermined wall paper information. Therefore, the video processing unit 70 displays the user data from the control unit 10 in the first and second display areas 81 and 83 of the display unit 80, as shown in FIG. 13A. Here, the user data may include, for example, caller information, current time information and communication state information. The user performs the voice communication function via the audio processor 25.

Fourthly, if the communication mode is the incoming call mode at step 811 and the voice communication mode at step 813 and the television display function is selected in the voice communication mode at step 821, the control unit 10 notifies the video processing unit 70 of information regarding these modes at step 827. Then at step 827, the I2C interface 115 in the video processing unit 70 controls the tuner 50 and decoder 60 to normally process a television signal of a currently selected channel, and blocks an audio signal from the decoder 60 so that the audio processor 25 can process an audio signal based on the voice communication function. Also at step 827, the memory controller 123 in the video processing unit 70 stores user data from the control unit 10 in the memory 131 and received television video data in the memories 133 and 135, respectively. At this time, provided that the television video data is being displayed at the QCIF size, the video processing unit 70 controls the display unit 80 to display the television video data in the first display area 81 of the display unit 80 and the user data from the control unit 10 in the second display area 83 thereof, respectively, as shown in FIG. 13C. Here, the user data may include, for example, caller information, current time information and communication state information. Alternatively, provided that the television video data is being displayed at the full size, the video processing unit 70 displays user data from the OSD controller 119 on a displayed picture in the OSD manner, as shown in FIG. 13B. The user performs the voice communication function via the audio processor 25.

If the communication mode is ended at step 829 after the communication service associated with the incoming call mode and the data communication mode or voice communication mode is provided in the above manner, then the control unit 10 returns to the television mode. At this time, the control unit 10 controls the video processing unit 70 to restore all functions to their states in the television mode associated service prior to the execution of the communication mode.

The outgoing call mode is performed under the condition that the television mode is performed, as follows.

Firstly, if the communication mode is the outgoing call mode at step 831 and the data communication mode at step 833 and the OSD function is selected in the data communication mode at step 835, the control unit 10 notifies the video processing unit 70 of information regarding these modes at step 837. Also at step 837, the control unit 10 transfers input data from the keypad 27 to the video processing unit 70. Then, the I2C interface 115 in the video processing unit 70 controls the tuner 50 and decoder 60 under the control of the control unit 10 such that they are not operated. Also, the memory controller 123 in the video processing unit 70 stores user data from the control unit 10 in the memories 131 and 133 and wall paper data in the memory 135, respectively. When no wall paper information is selected, a wall paper is displayed with a transparent color on the basis of predetermined wall paper information. Therefore, the video processing unit 70 displays the user data from the control unit 10 in the first and second display areas 81 and 83 of the display unit 80, as shown in FIG. 13A. Here, the user data may include, for example, called subscriber information and a text message to be transmitted from the calling party. Thereafter, if the user clicks on the confirm key at step 839 to command transmission of text data being displayed, then the control unit 10 transmits the text data at step 841.

Secondly, if the communication mode is the outgoing call mode at step 831 and the data communication mode at step 833 and the television display function is selected in the data communication mode at step 835, the control unit 10 notifies the video processing unit 70 of information regarding these modes at step 843. Also at step 843, the control unit 10 transfers input data to the video processing unit 70. Then at step 843, the video processing unit 70 stores user data from the control unit 10 in the memory 131 and received television video data in the memories 133 and 135, respectively. At this time, provided that the television video data is being displayed at the QCIF size, the video processing unit 70 controls the display unit 80 to display the television video data in the first display area 81 of the display unit 80 and the user data from the control unit 10 in the second display area 83 thereof, respectively, as shown in FIG. 13C. Here, the user data may include, for example, called subscriber information and a text message to be transmitted. Alternatively, provided that the television video data is being displayed at the full size, the video processing unit 70 displays a text message from the OSD controller 119 on a displayed picture in the OSD manner, as shown in FIG. 13B. Thereafter, if a transmission command is generated at step 839, then the control unit 10 transmits currently displayed text data at step 841.

Thirdly, if the communication mode is the outgoing call mode at step 831 and the voice communication mode at step 833 and the OSD function is selected in the voice communication mode at step 845, the control unit 10 notifies the video processing unit 70 of information regarding these modes at step 847. Then, the I2C interface 115 in the video processing unit 70 controls the tuner 50 and decoder 60 under the control of the control unit 10 such that they are not operated. Also, the memory controller 123 in the video processing unit 70 stores user data from the control unit 10 in the memories 131 and 133 and wall paper data in the memory 135, respectively. When no wall paper information is selected, a wall paper is displayed with a transparent color on the basis of predetermined wall paper information. Therefore, the video processing unit 70 displays the user data from the control unit 10 in the first and second display areas 81 and 83 of the display unit 80, as shown in FIG. 13A. Here, the user data may include, for example, called subscriber information, current time information and communication state information. The user performs the voice communication function via the audio processor 25. Thereafter, if the end key input is generated at step 849, the control unit 10 releases the call mode and then returns to the television mode.

Fourthly, if the communication mode is the outgoing call mode at step 831 and the voice communication mode at step 833 and the television display function is selected in the voice communication mode at step 845, the control unit 10 notifies the video processing unit 70 of information regarding these modes at step 851. Then at step 851, the I2C interface 115 in the video processing unit 70 controls the tuner 50 and decoder 60 to normally process a television signal of a currently selected channel, and blocks an audio signal from the decoder 60 so that the audio processor 25 can process an audio signal based on the voice communication function. Also at step 851, the memory controller 123 in the video processing unit 70 stores user data from the control unit 10 in the memory 131 and received television video data in the memories 133 and 135, respectively. At this time, provided that the television video data is being displayed at the QCIF size, the video processing unit 70 controls the display unit 80 to display the television video data in the first display area 81 of the display unit 80 and the user data from the control unit 10 in the second display area 83 thereof, respectively, as shown in FIG. 13C. Here, the user data may include, for example, called subscriber information, current time information and communication state information. Alternatively, provided that the television video data is being displayed at the full size, the video processing unit 70 displays user data from the OSD controller 119 on a displayed picture in the OSD manner, as shown in FIG. 13B. The user performs the voice communication function via the audio processor 25. Thereafter, if the end key input is generated at step 849, the control unit 10 releases the call mode and then returns to the television mode.

If the communication mode is ended after being performed in the above manner, then the control unit 10 returns to the television mode of the previous state.

As apparent from the above description, the present invention provides a mobile terminal which is capable of processing a received television video signal to display it as a television picture on a display unit thereof. The present mobile terminal can also scale up or rotate the displayed television picture, or capture and store it as a still picture. Further, when displaying the television picture, the mobile terminal can efficiently control memories to process the received video signal in real time. Furthermore, the mobile terminal can process a television mode in a menu manner, resulting in an increase in the convenience of television watching.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A video data display apparatus for a mobile terminal, the video data display apparatus comprising:
   a display unit capable of displaying a video image;
   a communication unit capable of receiving a text message from a mobile communication network;
   a user input unit capable of receiving a user input; and
   a controller capable of controlling, when a text message is received while a video image is being played on the display, the display unit to display the text message in a first area of the display unit while displaying the video image if the user has set a first mode and to display the text message in a second area of the display unit while displaying the video image if the user has set a second mode.

2. The video data display apparatus of claim 1, wherein the user has set the first mode and wherein the controller control the display to stop displaying the text message in the first area, which is located in a substantial center of the display unit on which the video image is being displayed, if the displaying of the text message is terminated while displaying the text message in the first area.

3. The video data display apparatus of claim 1, wherein the user has set the second mode and wherein the controller controls the display to stop displaying the text message in the second area, which is located in the side of the display unit excluding the center of the display unit, if the displaying of the text message is terminated while displaying the text message in the second area.

4. The video data display apparatus of claim 1,
wherein, in the first mode, the text message is displayed in the first area with a transparent background and the first area is located in a substantial center of the display unit, and
wherein, in the second mode, the text message is displayed in the second area with an opaque background and the second area is located in a side of the display unit excluding the center of the display unit.

5. The video data display apparatus of claim 1,
wherein, when playing a video, the first area displays the video and the second area displays data related to the video, the second area having a smaller size than the first area,
wherein, in the first mode, the text message is displayed in a substantial center of the display unit in the first area, and
wherein, in the second mode, the text message is displayed in the second area.

6. A video data display method for a mobile terminal, the video display method comprising:
setting, by a user of the mobile terminal, a mode for displaying a text message received from a mobile communication network while the mobile terminal is displaying a video image on a display unit;
upon receiving a text message when displaying the video image on the display unit:
if the user set a first mode, displaying the text message in a first area of the display unit while displaying the video image; and
if the user set a second mode, displaying the text message in a second area of the display unit while displaying the video image.

7. The video data display method of claim 6, wherein the mobile terminal is in the first mode of displaying the text message in the first area while the video is playing, the method further comprising:
if the displaying of the text message is terminated while displaying the text message in the first area, which is located in a substantial center of the display unit, stopping displaying the text message in the first area.

8. The video data display method of claim 6, wherein the mobile terminal is in the second mode of displaying the text message in the second area while the video is playing, the method further comprising:
if the displaying of the text message is terminated while displaying the text message in the second area, which is located in the side of the display unit excluding the center of the display unit, stopping displaying the text message in the second area.

9. The video data display method of claim 6,
wherein, in the first mode, the text message is displayed in the first area with a transparent background and the first area is located in a substantial center of the display unit, and
wherein, in the second mode, the text message is displayed in the second area with an opaque background and the second area is located in a side of the display unit excluding the center of the display unit.

10. The video data display method of claim 6,
wherein, when playing a video, a third area of the display unit displays the video and a fourth area of the display unit displays data related to the video, the fourth area having a smaller size than the third area,
wherein, in the first mode, the text message is displayed in the first area, which includes a center of the display unit in the third area while displaying the video image, and
wherein, in the second mode, the text message is displayed in the second area, which includes at least the fourth area.

\* \* \* \* \*